United States Patent
Cho

(10) Patent No.: US 12,056,392 B2
(45) Date of Patent: Aug. 6, 2024

(54) APPARATUS AND METHOD FOR TRANSFERRING DATA IN MEMORY SYSTEM

(71) Applicant: SK hynix Inc., Gyeonggi-do (KR)

(72) Inventor: Chan Hyeok Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/897,766

(22) Filed: Aug. 29, 2022

(65) Prior Publication Data

US 2023/0297274 A1    Sep. 21, 2023

(30) Foreign Application Priority Data

Mar. 17, 2022 (KR) .................. 10-2022-0033419

(51) Int. Cl.
*G06F 3/06* (2006.01)
(52) U.S. Cl.
CPC .......... *G06F 3/0658* (2013.01); *G06F 3/0604* (2013.01); *G06F 3/0679* (2013.01)
(58) Field of Classification Search
CPC .... G06F 3/0658; G06F 3/0604; G06F 3/0679; G06F 3/0631; G06F 3/0659
See application file for complete search history.

(56) References Cited

U.S. PATENT DOCUMENTS

| 10,365,834 | B2 | 7/2019 | Kojima et al. | |
| 2018/0286477 | A1* | 10/2018 | Chiu | G11C 11/5628 |
| 2019/0012099 | A1* | 1/2019 | Mulani | G06F 3/0655 |

* cited by examiner

*Primary Examiner* — Hiep T Nguyen
(74) *Attorney, Agent, or Firm* — IP & T GROUP LLP

(57) ABSTRACT

A memory system includes: a memory device including a plurality of pages each including a plurality of L-level cells, K planes each including the plurality of pages, and N memory dies each including the K planes; and a controller suitable for dividing logical addresses corresponding to write data, into a plurality of divided logical groups by grouping the logical addresses by a preset number, when performing a program operation of transferring the write data to the memory device to store, and mapping each of the plurality of divided logical groups to a reference logical unit in a first order of bits of the L-level cell, a second order of the N memory dies, and a third order of the K planes, according to a size of the write data, in order to decide an order in which the write data are to be transferred to the memory device.

23 Claims, 17 Drawing Sheets

APPARATUS AND METHOD FOR TRANSFERRING DATA IN MEMORY SYSTEM

CROSS-REFERENCE TO RELATED APPLICATION

This application claims priority under 35 U.S.C. § 119 to Korean Patent Application No. 10-2022-0033419 filed on Mar. 17, 2022, which is incorporated herein by reference in its entirety.

BACKGROUND

1. Field

Various embodiments of the present disclosure relate to a memory system, and more particularly, to an apparatus and method for transferring data in a memory system having a plurality of channels or ways.

2. Discussion of the Related Art

Recently, a computer environment paradigm has shifted to ubiquitous computing, which enables a computer system to be accessed anytime and everywhere. As a result, the use of portable electronic devices such as mobile phones, digital cameras, notebook computers and the like has increased. Such portable electronic devices typically use or include a memory system that uses or embeds at least one memory device, i.e., a data storage device. The data storage device can be used as a main storage device or an auxiliary storage device of a portable electronic device.

In a computing device, unlike a hard disk, a data storage device implemented as a nonvolatile semiconductor memory device is advantageous in that it has excellent stability and durability because it has no mechanical driving part (e.g., a mechanical arm), and has high data access speed and low power consumption. Examples of such a data storage device include a universal serial bus (USB) memory device, a memory card having various interfaces, and a solid state drive (SSD).

SUMMARY

Various embodiments of the present disclosure are directed to an apparatus and method for effectively transferring data smaller than a preset size in a memory system having a plurality of channels or ways.

The technical problems of the present disclosure are not limited to those mentioned above, and the other technical problems which are not mentioned can be clearly understood by the person skilled in the art from the following descriptions.

In an embodiment of the present disclosure, a memory system may include: a memory device comprising a plurality of pages each including a plurality of L-level cells, K planes each including the plurality of pages, and N memory dies each including the K planes; and a controller configured to divide logical addresses corresponding to write data transferred from a host, into a plurality of divided logical groups by grouping the logical addresses by a preset number, when performing a program operation of storing the write data in the memory device, and map each of the plurality of divided logical groups to a reference logical unit, which is determined in a first order of bits of the L-level cell, a second order of the N memory dies, and a third order of the K planes according to a size of the write data, in order to decide an order in which the write data are to be transferred from the controller to the memory device, wherein L, N, and K are natural numbers.

In an embodiment of the present disclosure, an operation method of a memory system including a memory device and a controller, the memory device comprising a plurality of pages each including a plurality of L-level cells, K planes each including the plurality of pages, and N memory dies each including the K planes and the controller configured to perform a program operation of storing into the memory device write data transferred from a host, the operation method comprising: a division operation of dividing, by the controller, logical addresses corresponding to the write data into a plurality of divided logical groups by grouping the logical addresses by a preset number; an order decision operation of mapping, by the controller, each of the plurality of divided logical groups to a reference logical unit, which is determined in a first order of bits of the L-level cell, a second order of the N memory dies, and a third order of the K planes according to a size of the write data, in order to decide an order in which the write data are to be transferred from the controller to the memory device; and a transfer operation of transferring, by the controller during the program operation, the write data in units of reference logical units from the controller to the memory device according to the order decided in the order decision operation, wherein L, N, and K are natural numbers.

In an embodiment of the present disclosure, a memory system may include: a memory device including N dies each including K planes each including one or more pages of cells each configured to be programmed through a 1/P program operation at a time and fully programmed through P times of the 1/P program operation, N being a multiple of P; and a controller configured to control the memory device to store data pieces each corresponding to L groups from at least $S*P/N$ groups each configured by at most $N/P$ logical addresses corresponding to at least a part of the data pieces, L being a number of bits to be maximally stored in each of the cells and S being a total number of logical addresses corresponding to the data pieces. The controller may control the memory device to store, through the 1/P program operation and in size units of $M/P$ pages, the respective data pieces in a plane, which is selected from the K planes, in the respective N dies when the data pieces have a less size than $K*N$ pages, M being equal to or greater than $((S*P/N)/(L*N))$ and less than $((S*P/N)/(L*N)+1)$ and equal to or less than K. N, K, P, M, L and S may be natural numbers.

In accordance with embodiments of the present disclosure, the apparatus and method may differently decide the order of an operation of transferring data smaller than a preset size and the order of an operation of transferring data larger than the preset size, in a memory system having a plurality of channels or ways.

Through this configuration, the data smaller than the preset size may be more effectively transferred.

DETAILED DESCRIPTION

Figure 1:
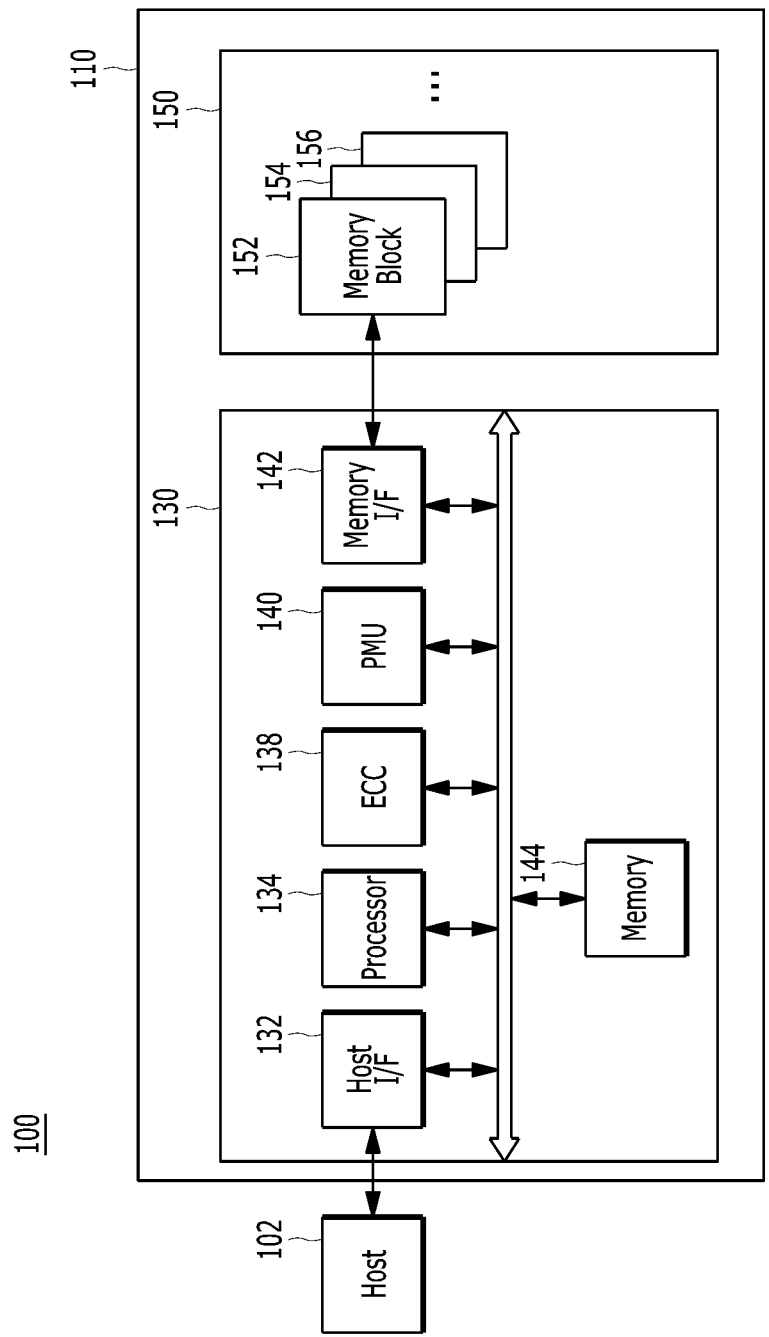
FIG. 1 is a diagram schematically illustrating an example of a data processing system including a memory system in accordance with an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language includes hardware—for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that implement or perform one or more tasks.

As used in this disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or a portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that the terms precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. For example, the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

FIG. 1 is a diagram schematically illustrating an example of a data processing system including a memory system in accordance with an embodiment of the present disclosure.

Referring to FIG. 1, the data processing system 100 may include a host 102 engaged or operably coupled with the memory system 110.

The host 102 may include any of a portable electronic device, such as a mobile phone, an MP3 player, a laptop computer, or the like, and an electronic device, such as a desktop computer, a game player, a television (TV), a projector, or the like.

The host 102 also includes at least one operating system (OS), which can generally manage and control, functions and operations performed in the host 102. The OS can provide interoperability between the host 102 engaged with the memory system 110 and the user using the memory system 110. The OS may support functions and operations corresponding to a user's requests. By way of example but not limitation, the OS can be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix, and the like. Further, the mobile operating system may include Android, iOS, Windows mobile, and the like. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110.

The memory system 110 operates in response to a request of the host 102, and, in particular, stores data to be accessed by the host 102. The memory system 110 may be used as a main memory device or an auxiliary memory device of the host 102. The memory system 110 may be implemented as any of various types of storage devices, depending on a host interface protocol which is coupled with the host 102. For example, the memory system 110 may be implemented as one of a solid state drive (SSD), a multimedia card (e.g., an MMC, an embedded MMC (eMMC), a reduced size MMC (RS-MMC) and a micro-MMC), a secure digital card (e.g., an SD, a mini-SD and a micro-SD), a universal serial bus (USB) storage device, a universal flash storage (UFS) device, a compact flash (CF) card, a smart media card, and a memory stick.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), and a flash memory.

The memory system 110 may include a controller 130 and a memory device 150. The memory device 150 may store data to be accessed by the host 102. The controller 130 may control an operation of storing data in the memory device 150.

The controller 130 and the memory device 150 included in the memory system 110 may be integrated into a single semiconductor device, which may be included in any of the various types of memory systems as discussed above in the examples.

By way of example but not limitation, the controller 130 and memory device 150 may be implemented with an SSD. When the memory system 110 is used as an SSD, the operating speed of the host 102 connected to the memory system 110 can be improved more than that of the host 102 implemented with a hard disk. In addition, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMCmicro), a SD card (SD, miniSD, microSD, SDHC), a universal flash memory, or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while electrical power is not supplied. The memory device 150 may store data provided by the host 102 through a write operation and provide data stored therein to the host 102 through a read operation. The memory device 150 may include a plurality of memory blocks 152, 154, and 156, each of which may include a plurality of pages. Each of the plurality of pages may include a plurality of memory cells to which a corresponding word line of a plurality of word lines (WL) is coupled. The memory device 150 also includes a plurality of memory dies, each of which includes a plurality of planes. Each of the planes includes some memory blocks among the plurality of memory blocks 152, 154, and 156. In addition, the memory device 150 may be a flash memory, and the flash memory may have a three-dimensional stack structure.

The controller 130 in the memory system 110 may control the memory device 150 in response to a request from the host 102. For example, the controller 130 may provide data read from the memory device 150, to the host 102, and may store data provided from the host 102, in the memory device 150. To this end, the controller 130 may control read, write, program, and erase operations of the memory device 150.

The controller 130 may include a host interface 132, a processor 134, error correction code (ECC) circuitry 138, a power management unit (PMU) 140, a memory interface 142, and a memory 144. Components included in the controller 130 as illustrated in FIG. 1 may vary according to structures, functions, operation performance, or the like, regarding the memory system 110.

The host 102 and the memory system 110 each may include a controller or an interface for transmitting and receiving signals, data, and the like, in accordance with one or more predetermined protocols. For example, the host interface 132 in the memory system 110 may include an apparatus capable of transmitting signals, data, and the like to the host 102 or receiving signals, data, and the like from the host 102.

The host interface 132 included in the controller 130 may receive signals, commands (or requests), and/or data input from the host 102 via a bus. For example, the host 102 and the memory system 110 may use a predetermined set of rules or procedures for data communication or a preset interface to transmit and receive data therebetween.

Examples of communication standards or interfaces used to transmit/receive data may include various form factors such as 2.5-inch form factor, 1.8-inch form factor, MO-297, MO-300, M.2, and EDSFF (Enterprise and Data Center SSD Form Factor) and various communication standards or interfaces such as USB (Universal Serial Bus), MMC (Multi-Media Card), PATA (Parallel Advanced Technology Attachment), SCSI (Small Computer System Interface), ESDI (Enhanced Small Disk Interface), IDE (Integrated Drive Electronics), PCIe (Peripheral Component Interconnect Express), SAS (Serial-attached SCSI), SATA (Serial Advanced Technology Attachment), and MIPI (Mobile Industry Processor Interface).

According to an embodiment, the host interface 132 is a type of layer for exchanging data with the host 102 and is implemented with, or driven by, firmware called a host interface layer (HIL). According to an embodiment, the host interface 132 can include a command queue.

The Integrated Drive Electronics (IDE) or Advanced Technology Attachment (ATA) may be used as one of the interfaces for transmitting and receiving data and, for example, may use a cable including 40 wires connected in parallel to support data transmission and data reception between the host 102 and the memory system 110. When a plurality of memory systems 110 are connected to a single host 102, the plurality of memory systems 110 may be divided into a master and a slave by using a position or a dip switch to which the plurality of memory systems 110 are connected. The memory system 110 set as the master may be used as a main memory device. The IDE (ATA) may include, for example, Fast-ATA, ATAPI, or Enhanced IDE (EIDE).

A Serial Advanced Technology Attachment (SATA) interface is a type of serial data communication interface that is compatible with various ATA standards of parallel data communication interfaces which are used by Integrated Drive Electronics (IDE) devices. The 40 wires in the IDE interface can be reduced to six wires in the SATA interface. For example, 40 parallel signals for the IDE can be converted into 6 serial signals for the SATA interface. The SATA interface has been widely used because of its faster data transmission and reception rate and its less resource consumption in the host 102 used for the data transmission and reception. The SATA interface may connect up to 30 external devices to a single transceiver included in the host 102. In addition, the SATA interface can support hot plugging that allows an external device to be attached to or detached from the host 102, even while data communication between the host 102 and another device is being executed. Thus, the memory system 110 can be connected or disconnected as an additional device, like a device supported by a universal serial bus (USB) even when the host 102 is powered on. For example, in the host 102 having an eSATA port, the memory system 110 may be freely attached to or detached from the host 102 like an external hard disk.

Small Computer System Interface (SCSI) is a type of serial data communication interface used for connecting a computer or a server with other peripheral devices. The SCSI can provide a high transmission speed, as compared with other interfaces such as IDE and SATA. In the SCSI, the host 102 and at least one peripheral device (e.g., memory system 110) are connected in series, but data transmission and reception between the host 102 and each peripheral device may be performed through a parallel data communication. In the SCSI, it is easy to connect or disconnect a device such as the memory system 110 to or from the host 102. The SCSI can support connections of 15 other devices to a single transceiver included in host 102.

Serial Attached SCSI (SAS) can be understood as a serial data communication version of the SCSI. In the SAS, the host 102 and a plurality of peripheral devices are connected in series, and data transmission and reception between the host 102 and each peripheral device may be performed in a serial data communication scheme. The SAS can support connection between the host 102 and the peripheral device through a serial cable instead of a parallel cable, to easily manage equipment using the SAS and enhance or improve operational reliability and communication performance. The SAS may support connections of eight external devices to a single transceiver included in the host 102.

The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. The PCIe can use a slot or a specific cable for connecting a computing device (e.g., host 102) and a peripheral device (e.g., memory system 110). For example, the PCIe can use a plurality of pins (e.g., 18 pins, 32 pins, 49 pins, or 82 pins) and at least one wire (e.g., ×1, ×4, ×8, or ×16) to achieve high speed data communication over several hundred MB per second (e.g., 250 MB/s, 500 MB/s, 984.6250 MB/s, or 1969 MB/s). According to an embodiment, the PCIe scheme may achieve bandwidths of tens to hundreds of Giga bits per second. The NVMe can support an operation speed of the non-volatile memory system 110, such as an SSD, that is faster than a hard disk.

According to an embodiment, the host 102 and the memory system 110 may be connected through a universal serial bus (USB). The Universal Serial Bus (USB) is a type of scalable, hot-pluggable plug-and-play serial interface that can provide cost-effective standard connectivity between the host 102 and peripheral devices such as a keyboard, a mouse, a joystick, a printer, a scanner, a storage device, a modem, a video camera, and the like. A plurality of peripheral devices such as the memory system 110 may be coupled to a single transceiver included in the host 102.

The ECC component 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. After performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit of the read data. When the number of the error bits is greater than or equal to a threshold number of correctable error bits, the ECC component 138 might not correct error bits but instead may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC component 138 may include any and all circuits, modules, systems or devices for performing the error correction operation based on at least one of the above described codes.

The PMU 140 may manage electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 when the memory device 150 is a flash memory and, in particular, when the memory device 150 is a NAND flash memory. The memory interface 142 can provide an interface for handling commands and data between the controller 130 and the memory device 150, for example, operations of NAND flash interface, in particular, operations between the controller 130 and the memory device 150. In accordance with an embodiment, the memory interface 142 can be implemented through firmware called a Flash Interface Layer (FIL) as a component for exchanging data with the memory device 150.

The memory 144 may support operations performed by the memory system 110 and the controller 130. The memory 144 may store temporary or transactional data which occurred or was delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data for the controller 130 and the memory device 150 in order to perform operations such as read operations, program/write operations or erase operations.

The memory 144 may be realized by a volatile memory. For example, the memory 144 may be realized by a static random access memory (SRAM) or a dynamic random access memory (DRAM). The memory 144 may exist inside the controller 130 as illustrated in the drawing. Alternatively, the memory 144 may exist outside the controller 130 unlike the illustration of the drawing. In this case, the memory 144 may be realized as an external volatile memory to and from which data is inputted and outputted from and to the controller 130 through a separate memory interface.

When the controller 130 controls read, write, program, and erase operations of the memory device 150, data to be transferred or generated between the controller 130 and the memory device 150 in the memory system 110 may be stored in the memory 144. For example, the memory 144 may store data necessary to perform data write and read operations between the host 102 and the memory device 150 and data when performing the data write and read operations. For such data storage, the memory 144 may include a program memory, a data memory, a write buffer/cache, a read buffer/cache, a data buffer/cache, a map buffer/cache, and so forth.

The processor 134 controls the entire operations of the memory system 110. In particular, the processor 134 controls a program operation or a read operation for the memory device 150, in response to a write request or a read request from the host 102. The processor 134 drives firmware which is referred to as a flash translation layer (FTL), to control general operations of the memory system 110. The processor 134 may be realized by a microprocessor or a central processing unit (CPU).

For instance, the controller 130 performs an operation requested from the host 102, in the memory device 150. That is, the controller 130 performs a command operation corresponding to a command received from the host 102, with the memory device 150, through the processor 134 embodied by a microprocessor or a central processing unit (CPU). The controller 130 may perform a foreground operation as a command operation corresponding to a command received from the host 102. For example, the controller 130 may perform a program operation corresponding to a write command, a read operation corresponding to a read command, an erase operation corresponding to an erase command, or a parameter set operation corresponding to a set parameter command or a set feature command as a set command.

The controller 130 may also perform a background operation for the memory device 150, through the processor 134 embodied by a microprocessor or a central processing unit (CPU). The background operation for the memory device 150 may include an operation of copying data stored in a memory block among the memory blocks 152, 154 and 156 of the memory device 150 to another memory block, for example, a garbage collection (GC) operation. The background operation may include an operation of swapping data between one or more of the memory blocks 152, 154 and 156 of the memory device 150, for example, a wear leveling (WL) operation and a read reclaim (RR) operation. The background operation may include an operation of storing map data retrieved from the controller 130 in the memory blocks 152, 154 and 156 of the memory device 150, for example, a map flush operation. The background operation may include a bad block management operation for the memory device 150, which may include checking for and processing a bad block among the plurality of memory blocks 152, 154 and 156 in the memory device 150.

Within the processor 134 of the controller 130, a component (not shown) for performing bad block management for the memory device 150 may be included. Such component performs bad block management of checking for a bad block among the plurality of memory blocks 152, 154 and 156 and processing the identified bad block as a bad. Through bad block management, a memory block in which a program fail has occurred is processed as a bad memory block, and program-failed data is written in a new memory block. The bad block management may be performed when a program fail may occur when performing data write (or program), due to the characteristic of the memory device 150 (e.g., a NAND flash memory).

The bad blocks may seriously aggravate the utilization efficiency of the memory device 150 having a 3D stack structure and the reliability of the memory system 110. Thus, reliable bad block management may enhance or improve performance of the memory system 110.

Figure 2:
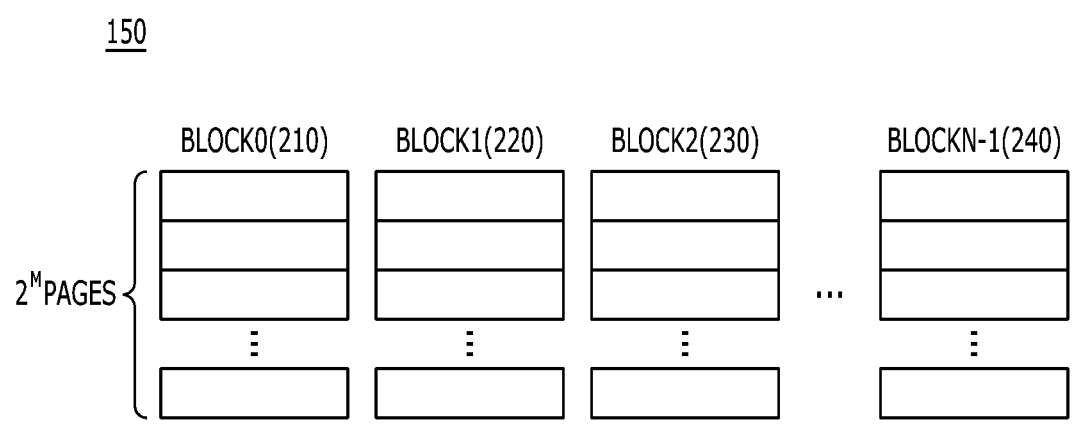
FIG. 2 is a diagram schematically illustrating an example of a memory device in the memory system in accordance with an embodiment of the present disclosure.
Figure 3:
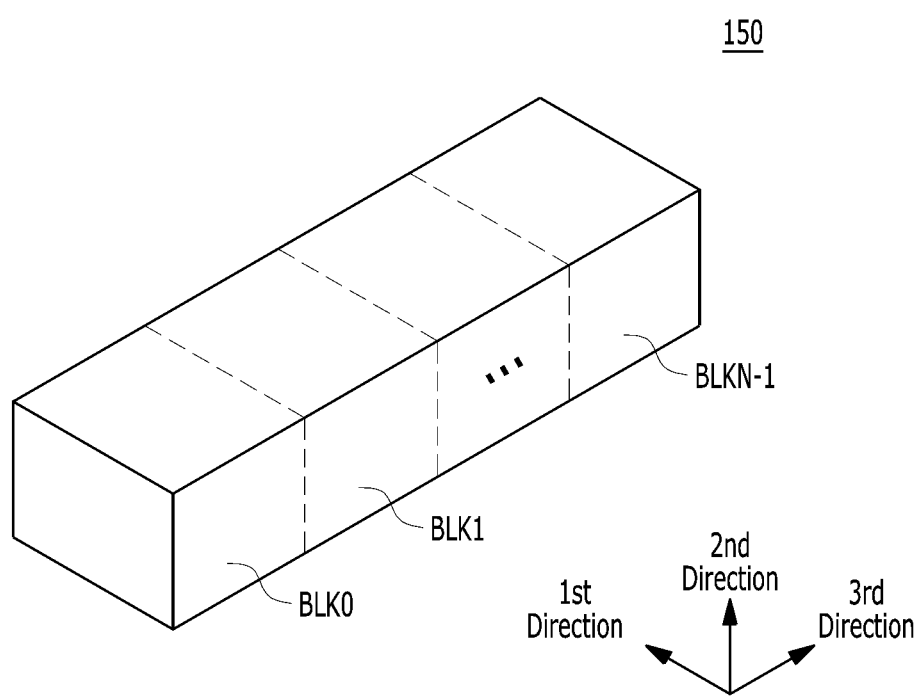
FIG. 3 is a diagram schematically illustrating the structure of the memory device in the memory system in accordance with an embodiment of the present disclosure.

FIG. 2 shows an example of an example of a memory device in the memory system in accordance with an embodiment of the present disclosure, and FIG. 3 shows an example of the structure of the memory device in the memory system in accordance with an embodiment of the present disclosure.

Referring to FIG. 2, the memory device 150 can include a plurality of memory blocks, such as a first block (BLOCK0) 210, a second block (BLOCK1) 220, a third block (BLOCK2) 230 to a nth block (BLOCKN−1) 240. Each of blocks 210, 220, 230 to 240 can include a plurality of pages, e.g., 2M pages, 2M Pages, or M pages. Here, n and M are natural numbers. For convenience of description, each of the memory blocks includes 2M pages. Each of the pages can include a plurality of non-volatile memory cells coupled via a word line (WL) with each other.

In an embodiment of the present disclosure, the memory device 150 is embodied as a nonvolatile memory such as a flash memory, e.g., a NAND flash memory, a NOR flash memory and the like. In other embodiments, the memory device 150 may be implemented by at least one of a phase change random access memory (PCRAM), a ferroelectrics random access memory (FRAM), a spin transfer torque random access memory (STT-RAM), and a spin transfer torque magnetic random access memory (STT-MRAM), or the like.

Each of the blocks 210, 220, 230 to 240 in the memory device 150 can store data provided from the host 102 through a program operation and provide the stored data to the host 102 through a read operation.

The memory device 150 may be implemented as a two-dimensional or three-dimensional memory device, and may be implemented as a non-volatile memory device of a three-dimensional solid stack structure. The memory device 150 may include a plurality of memory blocks BLK0 to BLKN−1. FIG. 3 is a block diagram for showing the memory blocks 152, 154, 156 of the memory device 150 shown in FIG. 1. Each of the memory blocks 152, 154, 156 can be implemented as a three-dimensional structure. For example, each of the memory blocks 152, 154, 156 may be realized by a structure with dimensions extending in mutually orthogonal directions, e.g., an x-axis direction, a y-axis direction, and a z-axis direction.

By way of example but not limitation, each memory block 330 included in the memory device 150 may include a plurality of NAND strings (NSs) extending along a second direction, and/or can be provided with a plurality of NAND strings (NSs) along with a first direction or a third direction. Here, each NAND string NS is coupled with I/O control circuits via at least one of a bit line BL, at least one string select line SSL, at least one drain select line DSL, a plurality of word lines WL, at least one dummy word Line DWL, and a common source line CSL. The NAND string (NS) may include a plurality of transistors for switching on plural lines.

Each of the plurality of memory blocks 152, 154, 156 in the memory device 150 can include a plurality of bit lines BL, a plurality of string select lines SSL, a plurality of drain select lines DSL, a plurality of word lines WL, a plurality of dummy word lines DWL and a plurality of common source lines CSL. Each memory block 330 includes a plurality of NAND strings (NSs) shown in FIG. 3.

Figure 4:
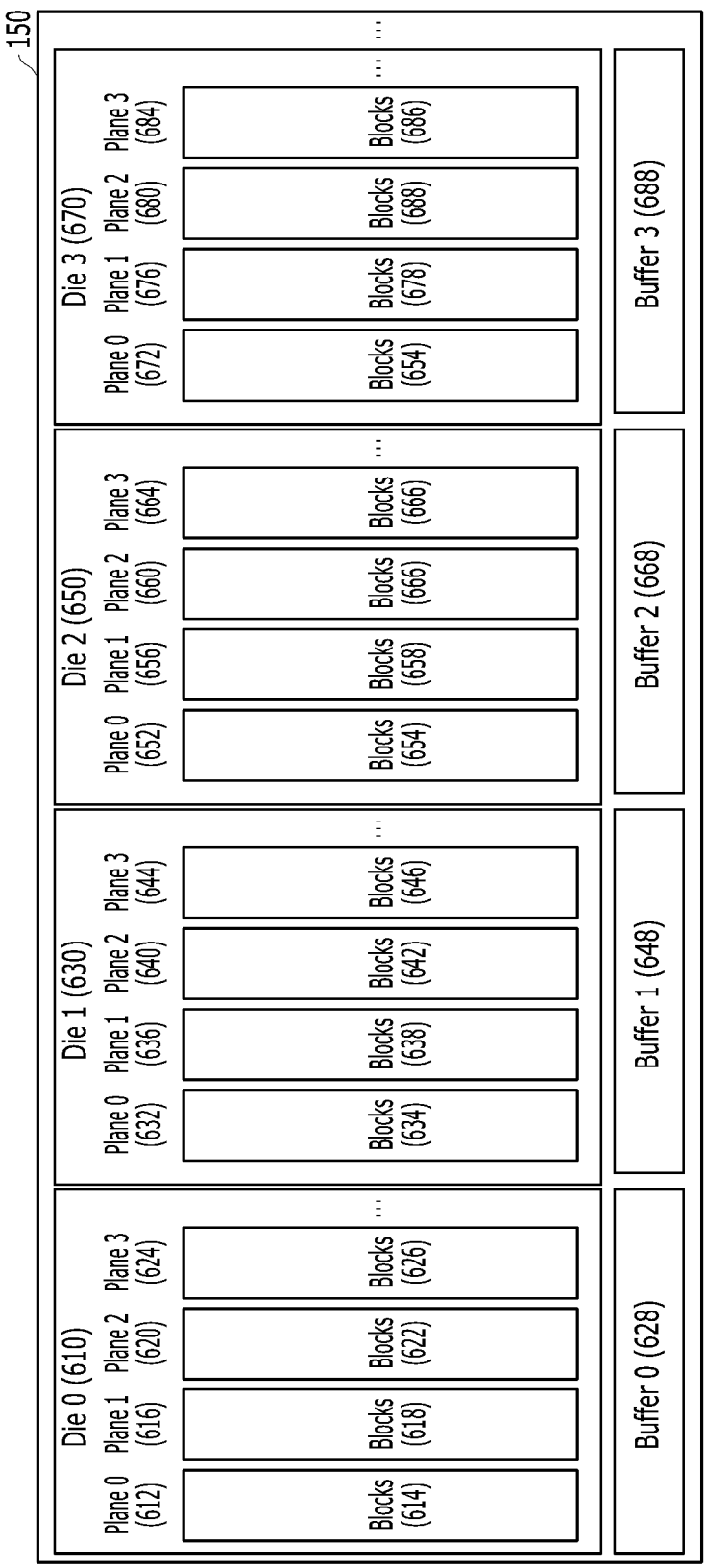
FIG. 4 is a diagram schematically illustrating an example of the case in which the memory system performs a plurality of command operations corresponding to a plurality of commands in accordance with an embodiment of the present disclosure.

FIG. 4 is a diagram schematically illustrating an example of the case in which the memory system performs a plurality of command operations corresponding to a plurality of commands in accordance with an embodiment of the present disclosure.

This is described in different contexts of a data processing operation, a first of which is a case where a plurality of write commands are received from the host 102 and program operations corresponding to the write commands are performed, a second of which is a case where a plurality of read commands are received from the host 102 and read operations corresponding to the read commands are performed, a third of which is a case where a plurality of erase commands are received from the host 102 and erase operations corresponding to the erase commands are performed, and a fourth of which is a case where a plurality of write commands and a plurality of read commands are received together from the host 102 and program operations and read operations corresponding to the write commands and the read commands are performed.

Moreover, in an embodiment of the present disclosure, a case is described in which write data corresponding to a plurality of write commands entered from the host 102 are stored in the buffer/cache included in the memory 144 of the controller 130, the write data stored in the buffer/cache are programmed to and stored in the plurality of memory blocks included in the memory device 150, map data are updated which correspond to the stored write data in the plurality of memory blocks, and the updated map data are stored in the plurality of memory blocks included in the memory device 150. A case is described in which program operations corresponding to a plurality of write commands entered from the host 102 are performed.

Furthermore, in still another embodiment of the present disclosure, a case is described in which a plurality of read commands are entered from the host 102 for the data stored in the memory device 150, data corresponding to the read commands are read from the memory device 150 by checking the map data of the data corresponding to the read commands, the read data are stored in the buffer/cache included in the memory 144 of the controller 130, and the data stored in the buffer/cache are provided to the host 102. A case where read operations corresponding to a plurality of read commands entered from the host 102 are performed is described.

In addition, in another embodiment of the present disclosure, a case is described in which a plurality of erase commands are received from the host 102 for the memory blocks included in the memory device 150, memory blocks are checked corresponding to the erase commands, the data stored in the checked memory blocks are erased, map data are updated which correspond to the erased data, and the updated map data are stored in the plurality of memory blocks included in the memory device 150. Namely, a case where erase operations corresponding to a plurality of erase commands received from the host 102 are performed is described.

In connection with such description, it is described as an example that the controller 130 performs command operations in the memory system 110. However, it is noted that, as described above, the processor 134 in the controller 130 may perform command operations in the memory system 110, through, for example, an FTL (flash translation layer).

Also, the controller 130 programs and stores user data and metadata corresponding to write commands entered from the host 102 in arbitrary memory blocks among the plurality of memory blocks included in the memory device 150, reads user data and metadata corresponding to read commands received from the host 102 from arbitrary memory blocks among the plurality of memory blocks included in the memory device 150, and provides the read data to the host 102 or erases user data and metadata corresponding to erase commands entered from the host 102, from arbitrary memory blocks among the plurality of memory blocks in the memory device 150.

Metadata may include first map data including a logical/physical (L2P: logical to physical) information (logical information) and second map data including a physical/logical (P2L: physical to logical) information (physical information), for data stored in memory blocks corresponding to a program operation. Also, the metadata may include an information on command data corresponding to a command received from the host 102, an information on a command operation corresponding to the command, an information on the memory blocks of the memory device 150 for which the command operation is to be performed, and an information on map data corresponding to the command operation. Metadata may include all remaining information and data excluding user data corresponding to a command received from the host 102.

That is, in an embodiment of the present disclosure, in the case where the controller 130 receives a plurality of write commands from the host 102, program operations corresponding to the write commands are performed, and user data corresponding to the write commands are written and stored in empty memory blocks, open memory blocks or free memory blocks for which an erase operation has been performed, among the memory blocks of the memory device 150. Also, first map data, including an L2P map table or an L2P map list in which logical information as the mapping information between logical addresses and physical addresses for the user data stored in the memory blocks are recorded, and second map data, including a P2L map table or a P2L map list in which physical information as the mapping information between physical addresses and logical addresses for the memory blocks stored with the user data are recorded, are written and stored in empty memory blocks, open memory blocks or free memory blocks among the memory blocks of the memory device 150.

Here, in the case where write commands are entered from the host 102, the controller 130 writes and stores user data corresponding to the write commands in memory blocks. The controller 130 stores, in other memory blocks, metadata including first map data and second map data for the user data stored in the memory blocks. Particularly, in correspondence to that the data segments of the user data are stored in the memory blocks of the memory device 150, the controller 130 generates and updates the L2P segments of first map data and the P2L segments of second map data as the map segments of map data among the meta segments of metadata. The controller 130 stores the map segments in the memory blocks of the memory device 150. The map segments stored in the memory blocks of the memory device 150 are loaded in the memory 144 included in the controller 130 and are then updated.

Further, in the case where a plurality of read commands are received from the host 102, the controller 130 reads read data corresponding to the read commands, from the memory device 150, stores the read data in the buffers/caches included in the memory 144 of the controller 130. The controller 130 provides the data stored in the buffers/caches, to the host 102, by which read operations corresponding to the plurality of read commands are performed.

In addition, in the case where a plurality of erase commands are received from the host 102, the controller 130 checks memory blocks of the memory device 150 corresponding to the erase commands, and then, performs erase operations for the memory blocks.

When command operations corresponding to the plurality of commands received from the host 102 are performed while a background operation is performed, the controller 130 loads and stores data corresponding to the background operation, that is, metadata and user data, in the buffer/cache included in the memory 144 of the controller 130, and then stores the data, that is, the metadata and the user data, in the memory device 150. By way of example but not limitation, the background operation may include a garbage collection operation or a read reclaim operation as a copy operation, a wear leveling operation as a swap operation or a map flush operation, For instance, for the background operation, the controller 130 may check metadata and user data corresponding to the background operation, in the memory blocks of the memory device 150, load and store the metadata and user data stored in certain memory blocks of the memory device 150, in the buffer/cache included in the memory 144 of the controller 130, and then store the metadata and user data, in certain other memory blocks of the memory device 150.

In the memory system in accordance with an embodiment of the present disclosure, in the case of performing command operations as foreground operations and a copy operation, a swap operation and a map flush operation as background operations, the controller 130 schedules queues corresponding to the foreground operations and the background operations and allocates the scheduled queues to the memory 144 included in the controller 130 and the memory included in the host 102. In this regard, the controller 130 assigns identifiers (IDs) by respective operations for the foreground operations and the background operations to be performed in the memory device 150, and schedules queues corresponding to the operations assigned with the identifiers, respectively. In the memory system in accordance with an embodiment of the present disclosure, identifiers are assigned not only by respective operations for the memory device 150 but also by functions for the memory device 150, and queues corresponding to the functions assigned with respective identifiers are scheduled.

In the memory system in accordance with an embodiment of the present disclosure, the controller 130 manages the queues scheduled by the identifiers of respective functions and operations to be performed in the memory device 150. The controller 130 manages the queues scheduled by the identifiers of a foreground operation and a background operation to be performed in the memory device 150. In the memory system in accordance with an embodiment of the present disclosure, after memory regions corresponding to the queues scheduled by identifiers are allocated to the memory 144 included in the controller 130 and the memory included in the host 102, the controller 130 manages addresses for the allocated memory regions. The controller 130 performs not only the foreground operation and the background operation but also respective functions and operations in the memory device 150, by using the scheduled queues.

Referring to FIG. 4, the memory device 150 includes a plurality of memory dies, for example, a memory die 0, a memory die 1, a memory die 2 and a memory die 3, and each of the memory dies includes a plurality of planes, for example, a plane 0, a plane 1, a plane 2 and a plane 3. The respective planes in the memory dies included in the memory device 150 include a plurality of memory blocks, for example, N number of blocks Block0, Block1, . . . , BlockN−1 each including a plurality of pages, for example, 2M number of pages, as described above with reference to FIG. 3. Moreover, the memory device 150 includes a plurality of buffers corresponding to the respective memory dies, for example, a buffer 0 corresponding to the memory die 0, a buffer 1 corresponding to the memory die 1, a buffer 2 corresponding to the memory die 2 and a buffer 3 corresponding to the memory die 3.

In the case of performing command operations corresponding to a plurality of commands received from the host 102, data corresponding to the command operations are stored in the buffers included in the memory device 150. For example, in the case of performing program operations, data corresponding to the program operations are stored in the buffers, and are then stored in the pages included in the memory blocks of the memory dies. In the case of performing read operations, data corresponding to the read operations are read from the pages included in the memory blocks of the memory dies, are stored in the buffers, and are then provided to the host 102 through the controller 130.

In an embodiment of the present disclosure, while it will be described below as an example that the buffers in the memory device 150 exist outside the respective corresponding memory dies, it is to be noted that the buffers may exist inside the respective corresponding memory dies, and it is to be noted that the buffers may correspond to the respective planes or the respective memory blocks in the respective memory dies. Further, while it will be described below as an example that the buffers in the memory device 150 are the plurality of page buffers 322, 324 to 326 as described above with reference to FIG. 3, it is to be noted that the buffers may be a plurality of caches or a plurality of registers included in the memory device 150.

Also, the plurality of memory blocks included in the memory device 150 may be grouped into a plurality of super memory blocks, and command operations may be performed in the plurality of super memory blocks. Each of the super memory blocks may include a plurality of memory blocks, for example, memory blocks included in a first memory block group and a second memory block group. In this regard, in the case where the first memory block group is included in the first plane of a certain first memory die, the second memory block group may be included in the first plane of the first memory die, be included in the second plane of the first memory die or be included in the planes of a second memory die.

In an embodiment of the present disclosure, a data processing system may include plural memory systems. Each of the plural memory systems 110 can include the controller 130 and the memory device 150. In the data processing system, one of the plural memory systems 110 can be a master and the others can be a slave. The master may be determined based on contention between the plural memory systems 110. When a plurality of commands is delivered from the host 102 in the data processing system, the master can determine a destination for each command based at least on statuses of channels or buses. For example, a first memory system can be determined as a master memory system among a plurality of memory systems, corresponding to information delivered from the plurality of memory systems. If the first memory system is determined as the master memory system, the remaining memory systems are considered slave memory systems. A controller of the master memory system can check statuses of a plurality of channels (or ways, buses) coupled to a plurality of memory systems, to select which memory system handles commands or data delivered from the host 102. In an embodiment, a master can be dynamically determined among the plural memory systems. In another embodiment, a master memory system may be changed with one of other slave memory systems periodically or according to an event.

A method and apparatus for transferring data in the memory system 110 including the memory device 150 and the controller 130 is described below in more detail. As the amount of data stored in the memory system 110 becomes larger, the memory system 110 may be required to read or store large amounts of data at a time. However, a read time for reading a data stored in the memory device 150 or a program/write time for writing a data in the memory device 150 may be generally longer than a processing time for the controller 130 to process a data or a data transmission time for data transfer between the controller 130 and the memory system 150. For example, the read time might be twice the processing time. Since the read time or the program time is relatively far longer than the processing time or the data transmission time, a procedure or a process for delivering data in the memory system 110 may affect performance of the memory system 110, e.g., an operation speed, and/or structure of the memory system 110 such as a buffer size.

Figure 5:
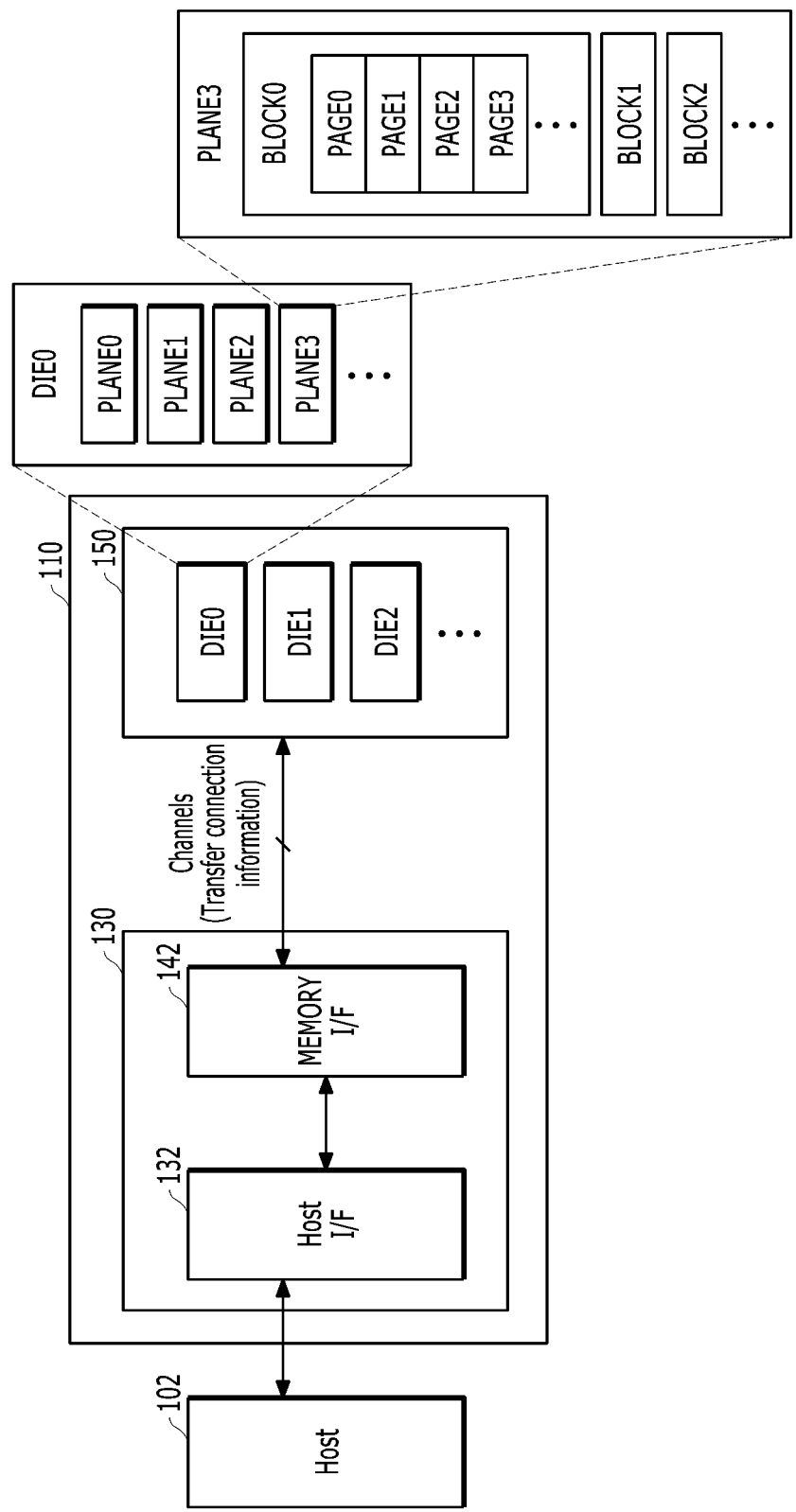
FIG. 5 is a diagram schematically illustrating an example of a coupling structure between a controller and the memory device in the memory system in accordance with an embodiment of the present disclosure.

FIG. 5 is a diagram schematically illustrating an example of a coupling structure between the controller and the memory device in the memory system in accordance with an embodiment of the present disclosure.

Referring to FIG. 5, the memory system 110 may be mounted on a computing device or mobile device as described with reference to FIGS. 1 to 4, and then transmit/receive data while interworking with the host 102.

Specifically, the memory system 110 includes the controller 130 and the memory device 150. The controller 130 may control the memory device 150 to output data requested by the host 102, or control the memory device 150 to store data transferred from the host 102. The memory device 150 includes a plurality of cells capable of storing data. The internal configuration of the memory device 150 may be changed in design according to the characteristics of the memory device 150, the purpose of use of the memory system 110 or the specification of the memory system 110, requested by the host 102.

The controller 130 and the memory device 150 may exchange data with each other through a plurality of channels. However, in order for the controller 130 to read or write data from or to the memory device 150, a control variable or control signal which is added according to the internal structure of the memory device 150 may be further needed.

The more the number of cells in the memory device 150 which can store data, the more complex the internal structure of the memory device 150 may become as described with reference to FIG. 4. For example, the memory device 150 may include N memory dies DIE0, DIE1, DIE2, . . . . Furthermore, the N memory dies DIE0, DIE1, DIE2, . . . may each include K planes PLANE0, PLANE1, PLANE2, PLANE3, . . . . Furthermore, the K planes PLANE0, PLANE1, PLANE2, PLANE3, . . . may each include a plurality of memory blocks BLOCK0, BLOCK1, BLOCK2, . . . . Furthermore, the plurality of memory blocks BLOCK0, BLOCK1, BLOCK2, . . . may each include a plurality of pages PAGE0, PAGE1, PAGE2, PAGE3, . . . . Furthermore, the plurality of pages PAGE0, PAGE1, PAGE2, PAGE3, . . . may each include a plurality of L-level cells. Here, N, K and L may be each natural numbers equal to or greater than 1.

In an embodiment, when N is 1, it may indicate a memory device having an SDP (Single Die Package) structure. In another embodiment, when N is 2, it may indicate a memory device having a DDP (Double Die Package) structure. In still another embodiment, when N is 4, it may indicate a memory device having a QDP (Quarter Die Package) structure. In yet another embodiment, when N is 8, it may indicate a memory device having an ODP (Octet Die Package) structure.

In an embodiment, when N is 4 and K is 1, it may indicate a memory device having a 1-plane QDP structure. In another embodiment, when N is 4 and K is 4, it may indicate a memory device having a 4-plane QDP structure. In an embodiment, when L is 1, the L-level cell may indicate an SLC (Single Level Cell). In another embodiment, when L is 2, the L-level cell may indicate an MLC (Multi-Level Cell). In still another embodiment, when L is 3, the L-level cell may indicate a TLC (Triple Level Cell). In yet another embodiment, when L is 4, the L-level cell may indicate a QLC (Quadruple Level Cell).

The controller 130 may transfer or receive connection information based on the internal configuration of the memory device 150 with data. The connection information may include information on the N memory dies DIE0, DIE1, DIE2, . . . , which are identified through a plurality of channels and a plurality of ways, the K planes PLANE0, PLANE1, PLANE2, PLANE3, . . . , and L bits of L-level data stored in each of the L-level cells. That is, when the controller 130 transfers data to the memory device 150 or reads data from the memory device 150, the controller 130 may decide where data is located or where to locate data, on the basis of the information on the N memory dies DIE0, DIE1, DIE2, . . . , the K planes PLANE0, PLANE1, PLANE2, PLANE3, . . . , and the L bits of the L-level data stored in the L-level cell.

Specifically, when performing a program operation of transferring write data, transferred from the host 102, to the memory device 150 to store the write data, the controller 130 may divide logical addresses of the write data into a plurality of divided logical groups by grouping the logical addresses by a preset number.

Here, the standards for dividing the logical addresses corresponding to the write data may be changed depending on whether the controller 130 allows a partial program operation on each of the plurality of pages included in the memory device 150. In this case, the partial program operation may indicate a program operation capable of partially storing data smaller than one page size in each of the pages.

If the partial program operation is not allowed, the smallest size of the data which can be stored in the memory device 150 through the program operation may correspond to the size of one page. In this case, the controller 130 may configure a plurality of divided logical groups by dividing logical addresses corresponding to write data by the number of the memory dies, i.e., N.

More specifically, when the number of the logical addresses corresponding to the write data is a multiple of N, the number of the divided logical groups may be a quotient obtained by dividing the number of the logical addresses corresponding to the write data by N.

In an embodiment, when the partial program operation is not allowed, the number N of memory dies included in the memory device 150 is 4, and eight logical addresses correspond to write data, the eight logical addresses may be divided into two divided logical groups each including four logical addresses. In another embodiment, when the partial program operation is not allowed, the number N of memory dies included in the memory device 150 is 4, and 32 logical addresses correspond to write data, the 32 logical addresses may be divided into eight divided logical groups each including four logical addresses. In still another embodiment, when the partial program operation is not allowed, the number N of memory dies included in the memory device 150 is 2, and 32 logical addresses correspond to write data, the 32 logical addresses may be divided into 16 divided logical groups each including two logical addresses.

Furthermore, when the number of the logical addresses corresponding to the write data is not a multiple of N, the number of the divided logical groups may be a value obtained by adding 1 to a quotient which is obtained by dividing the number of the logical addresses corresponding to the write data by N.

In an embodiment, when the partial program operation is not allowed, the number N of memory dies included in the memory device 150 is 4, and 34 logical addresses correspond to write data, the 34 logical addresses may be divided into eight divided logical groups each including four logical addresses and one divided logical group including two logical addresses. That is, the 34 logical addresses may be divided into a total of nine divided logical groups. In another embodiment, when the partial program operation is not allowed, the number N of memory dies included in the memory device 150 is 4, and three logical addresses correspond to write data, the three logical addresses may be configured as one divided logical group including three logical addresses.

If the partial program operation is allowed, the smallest size of the data which can be stored in the memory device 150 through the program operation may be smaller than the size of one page. In this case, the controller 130 may configure a plurality of divided logical groups by dividing logical addresses corresponding to write data by N/P, wherein N is a number N of the memory dies and P is a number of times that a partial program operation is performed on a cell to fully program the cell. Here, P may be a natural number, and N may be a multiple of P. When P is 1, a partial program operation may be regarded as a normal program operation that is performed on a cell once to fully program the cell.

More specifically, when the number of the logical addresses corresponding to the write data is a multiple of N/P, the number of the divided logical groups may be a quotient obtained by dividing the number of the logical addresses corresponding to the write data by N/P.

In an embodiment, when the number N of memory dies included in the memory device 150 is 4, the number P of partial program operations is 4, and eight logical addresses correspond to write data, the eight logical addresses may be divided into eight divided logical groups each including one logical address. In another embodiment, when the number N of memory dies included in the memory device 150 is 4, the number P of partial program operations is 2, and eight logical addresses correspond to write data, the eight logical addresses may be divided into four divided logical groups each including two logical addresses.

Furthermore, when the number of the logical addresses corresponding to the write data is not a multiple of N/P, the number of the divided logical groups may be a value obtained by adding 1 to a quotient which is obtained by dividing the number of the logical addresses corresponding to the write data by N/P.

In an embodiment, when the number N of memory dies included in the memory device 150 is 4, the number P of partial program operations is 4, and nine logical addresses correspond to write data, the nine logical addresses may be divided into nine divided logical groups each including one logical address. In another embodiment, when the number N of memory dies included in the memory device 150 is 4, the number P of partial program operations is 2, and three logical addresses correspond to write data, the three logical addresses may be divided into one divided logical group including two logical addresses and one divided logical group including one logical address. That is, the three logical addresses may be divided into a total of two divided logical groups.

For reference, the number P of partial program operations which can be performed on one page may be expressed as a unit referred to as NOP (Number of Program). For example, when the NOP is two, the controller 130 may sequentially perform two partial program operations respectively on first and second halves of memory cells included in a single page (hereinafter, referred to as first and second half parts of a single page). Furthermore, when the NOP is four, the controller 130 may sequentially perform four partial program operations respectively on first to fourth quarters of memory cells included in a single page (hereinafter, referred to as first to fourth quarter parts of a single page).

When performing the program operation, the controller 130 may divide logical addresses corresponding to write data into a plurality of divided logical groups, and then map the plurality of divided logical groups on the basis of a reference logical unit by differently combining a first order of the L bits of the L-level data stored in the L-level cell, a second order of the N memory dies DIE0, DIE1, DIE2, . . . , and a third order of the K planes PLANE0, PLANE1, PLANE2, PLANE3, . . . according to the size of the write data, thereby deciding the order in which the write data are transferred to the memory device 150.

In an embodiment, when the size of the write data transferred from the host 102 is smaller than a preset size, the controller 130 may map the plurality of divided logical groups, configured by grouping the logical addresses corresponding to the write data by the preset number, on the basis of the reference logical unit according to the first order of the bits of the L-level cell, change the second order of the N memory dies DIE0, DIE1, DIE2, . . . , perform mapping according to the second order, and then change the third order of the K planes PLANE0, PLANE1, PLANE2, PLANE3, . . . .

In another embodiment, when the size of the write data transferred from the host 102 is equal to or larger than the preset size, the controller 130 may map the plurality of divided logical groups, configured by grouping the logical addresses corresponding to the write data by the preset number, on the basis of the reference logical unit according to the first order of the bits of the L-level cell, change the third order of the K planes PLANE0, PLANE1, PLANE2, PLANE3, . . . , perform mapping according to the third order, and then change the second order of the N memory dies DIE0, DIE1, DIE2, . . . .

The preset size may correspond to a size obtained by multiplying the number N of memory dies included in the memory device 150, the number K of planes included in one memory die, and the size of one page among the plurality of pages included in one plane.

In an embodiment, when N and K are each 4 and one page including a plurality of SLCs has a size of 16 Kbyte, the preset size may become 256 Kbyte. In another embodiment, when N and K are each 4 and one page including a plurality of TLCs has a size of 48 Kbyte, the preset size may become 768 Kbyte. In still another embodiment, when N is 4, K is 1, and one page including a plurality of SLCs has a size of 16 Kbyte, the preset size may become 48 Kbyte.

The controller 130 may decide the order in which the plurality of divided logical groups configured by grouping the logical addresses corresponding to the write data by the preset number are transferred to the memory device 150, and then transfer the write data by the reference logical unit to the memory device 150 according to the decided transfer order, in order to perform the program operation.

The reference logical unit may be considered as a unit for storing or reading data into or from the memory device 150. That is, the controller 130 included in the memory system 110 may perform the program operation by transferring the write data from the host 102 by the reference logical unit to the memory device 150.

In this case, the controller 130 may adjust the reference logical unit according to the number of the divided logical groups and the information on whether the partial program operation is allowed (i.e., P is greater than 1).

Specifically, when the partial program operation is not allowed (i.e., P is 1) and the number of the divided logical groups exceeds (M−1)*N*L and is equal to or smaller than M*N*L, the controller 130 may set M pages to the reference logical unit. In this case, M may be a natural number equal to or smaller than K. Furthermore, N may represent the number of memory dies included in the memory device 150, and K may represent the number of planes included in one memory die.

In an embodiment, when the partial program operation is not allowed (i.e., P is 1), the number N of SLC (i.e., L is 1) memory dies included in the memory device 150 is 4, and the number of divided logical groups is two, M may be set to 1, and one page may be set to the reference logical unit. In another embodiment, when the partial program operation is not allowed (i.e., P is 1), the number N of SLC (i.e., L is 1) memory dies included in the memory device 150 is 4, and the number of divided logical groups is eight, M may be set to 2, and two pages may be set to the reference logical unit.

Specifically, when 1/P partial program operation is allowed (i.e., P is greater than 1) for each of the plurality of pages and the number of the divided logical groups exceeds (M−1)*N*L and is equal to or smaller than M*N*L, the controller 130 may set M/P pages to the reference logical unit. Here, M may be a natural number equal to or smaller than K, P may be a natural number equal to or larger than 2, and N may be a multiple of P. Furthermore, N may represent the number of memory dies included in the memory device 150, and K may represent the number of planes included in one memory die.

In an embodiment, when the number N of SLC (i.e., L is 1) memory dies included in the memory device 150 is 4, the number of the divided logical groups is two, and ¼ partial program operation is allowed (i.e., P is 4 greater than 1), M may be set to 1, and a quarter page may be set to the reference logical unit. In another embodiment, when the number N of SLC (i.e., L is 1) memory dies included in the memory device 150 is 4, the number of the divided logical groups is eight, and ¼ partial program operation is allowed (i.e., P is 4 greater than 1), M may be set to 2, and a half page may be set to the reference logical unit.

Figure 6:
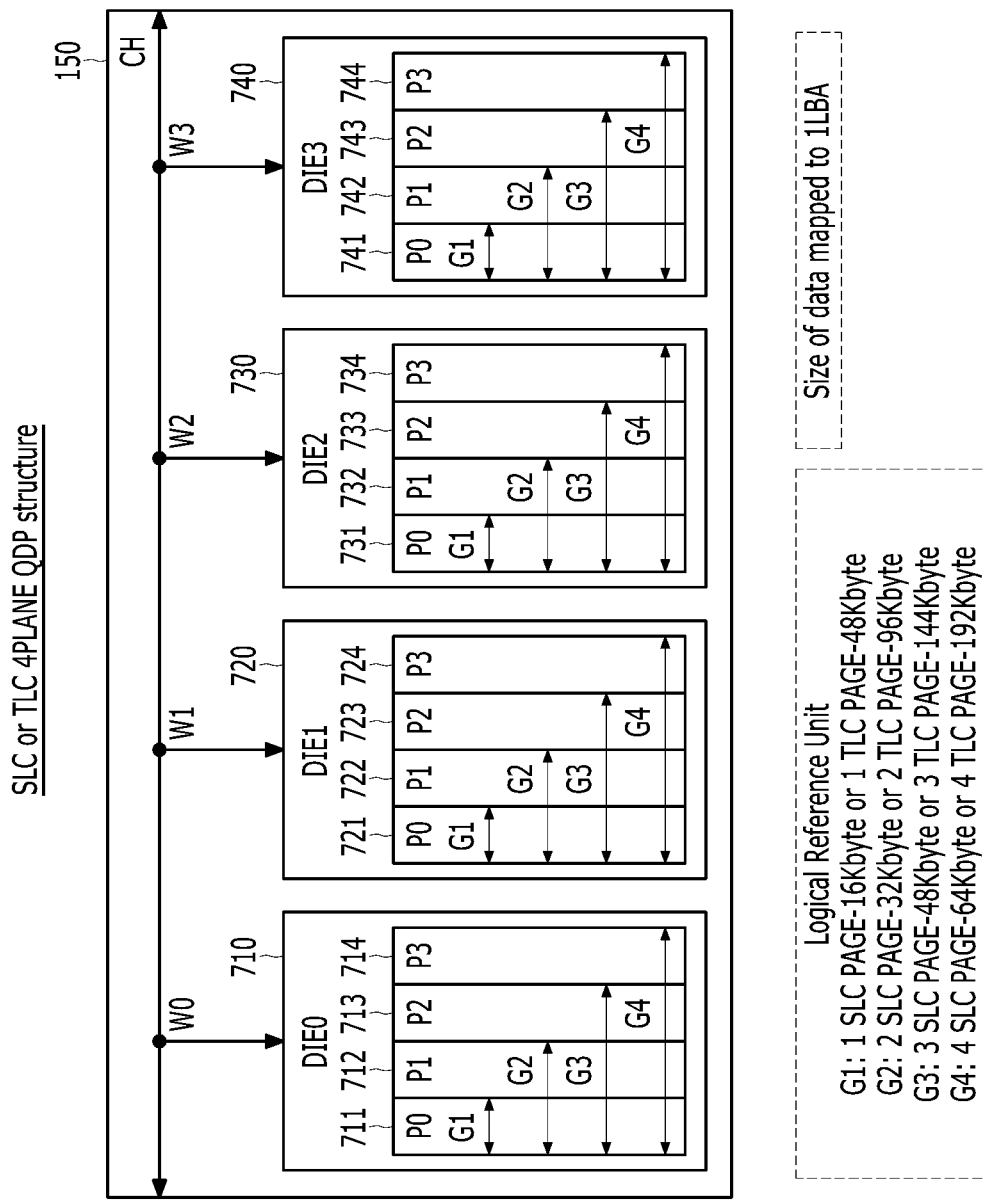
FIG. 6 is a diagram schematically illustrating an example of the internal structure of the memory device in accordance with an embodiment of the present disclosure.

FIG. 6 is a diagram schematically illustrating an example of the internal structure of the memory device in accordance with an embodiment of the present disclosure.

FIG. 6 may be based on that N and K are each 4 and L is 1 or 3 in the internal configuration of the memory device 150 in FIG. 5. Furthermore, FIG. 6 may be based on that the partial program operation is not allowed (i.e., P is 1).

Specifically, FIG. 6 discloses a 4-plane QDP structure in which the memory device 150 includes four memory dies 710, 720, 730, and 740, and the four memory dies 710, 720, 730, and 740 are coupled to one channel CH through four ways W0, W1, W2, and W3, respectively, and include four planes 711, 712, 713, and 714, 721, 722, 723, and 724, 731, 732, 733, and 734, and 741, 742, 743, and 744, respectively. In this case, when each of the four planes 711, 712, 713, and 714, 721, 722, 723, and 724, 731, 732, 733, and 734, or 741, 742, 743, and 744 includes a plurality of SLCs, the corresponding structure may indicate an SLC 4-plane QDP structure, and when each of the four planes 711, 712, 713, and 714, 721, 722, 723, and 724, 731, 732, 733, and 734, or 741, 742, 743, and 744 includes a plurality of TLCs, the corresponding structure may indicate a TLC 4-plane QDP structure.

In the 4-plane QDP structure, the four memory dies 710, 720, 730, and 740 may be coupled to one channel CH through the four ways W0, W1, W2, and W3, respectively. Therefore, the four memory dies 710, 720, 730, and 740 may operate in an interleaving manner, but the four planes 711, 712, 713, and 714, 721, 722, 723, and 724, 731, 732, 733, and 734, or 741, 742, 743, and 744 may not operate in an interleaving manner.

More specifically, one page corresponds to four logical addresses LBA, and the size of data mapped to one logical address (1 LBA) is 4 Kbyte. Furthermore, since the partial program operation is not allowed (i.e., P is 1), the smallest reference logical unit may correspond to one page, i.e., one plane.

Here, when the plurality of memory cells included in the four planes 711, 712, 713, and 714, 721, 722, 723, and 724, 731, 732, 733, and 734, or 741, 742, 743, and 744 are set to SLCs, the size of data mapped to a reference logical unit G1 including one SLC page (1 SLC PAGE) may be 16 Kbyte, the size of data mapped to a reference logical unit G2 including two SLC pages (2 SLC PAGE) may be 32 Kbyte, the size of data mapped to a reference logical unit G3 including three SLC pages (3 SLC PAGE) may be 48 Kbyte, and the size of data mapped to a reference logical unit G4 including four SLC pages (4 SLC PAGE) may be 64 Kbyte. In this case, the four memory dies 710, 720, 730, and 740 include the four planes 711, 712, 713, and 714, 721, 722, 723, and 724, 731, 732, 733, and 734, and 741, 742, 743, and 744, respectively. Therefore, when write data are stored on the basis of the reference logical unit G4 including four SLC pages (4 SLC PAGE), it may be considered that the data are stored in a full sync interleaving manner.

Similarly, when the plurality of memory cells included in the four planes 711, 712, 713, and 714, 721, 722, 723, and 724, 731, 732, 733, and 734, or 741, 742, 743, and 744 are set to TLCs, the size of data mapped to a reference logical unit G1 including one TLC page (1 TLC PAGE) may be 48 Kbyte, the size of data mapped to a reference logical unit G2 including two TLC pages (2 TLC PAGE) may be 96 Kbyte, the size of data mapped to a reference logical unit G3 including three TLC pages (3 TLC PAGE) may be 144 Kbyte, and the size of data mapped to a reference logical unit G4 including four TLC pages (4 TLC PAGE) may be 192 Kbyte. In this case, the four memory dies 710, 720, 730, and 740 include the four planes 711, 712, 713, and 714, 721, 722, 723, and 724, 731, 732, 733, and 734, and 741, 742, 743, and 744, respectively. Therefore, when write data are stored on the basis of the reference logical unit G4 including four TLC pages (4 TLC PAGE), it may be considered that the data are stored in a full sync interleaving manner.

For reference, FIG. 6 discloses the structure in which the memory device 150 includes the four memory dies 710, 720, 730, and 740, and the four memory dies 710, 720, 730, and 740 are coupled to one channel through the four ways W0, W1, W2, and W3, respectively, but this is only an embodiment. That is, in accordance with various embodiments, the memory device 150 may include various numbers of memory dies, e.g., two or eight memory dies, various numbers of channels, e.g., one to five channels may be provided, and various numbers of ways, e.g., one to five ways may be provide depending on how many dies are coupled to one channel. That is, the numbers of memory dies, channels, and ways within the memory device 150 can be changed in design according to the purpose of use and the performance requirement of the memory system.

FIGS. 7 to 12 are timing diagrams for describing various examples of an operation of transferring data between the controller and the memory device in the memory system by referring to the internal structure of the memory device illustrated in FIG. 6 in accordance with an embodiment of the present disclosure.

Figure 7:
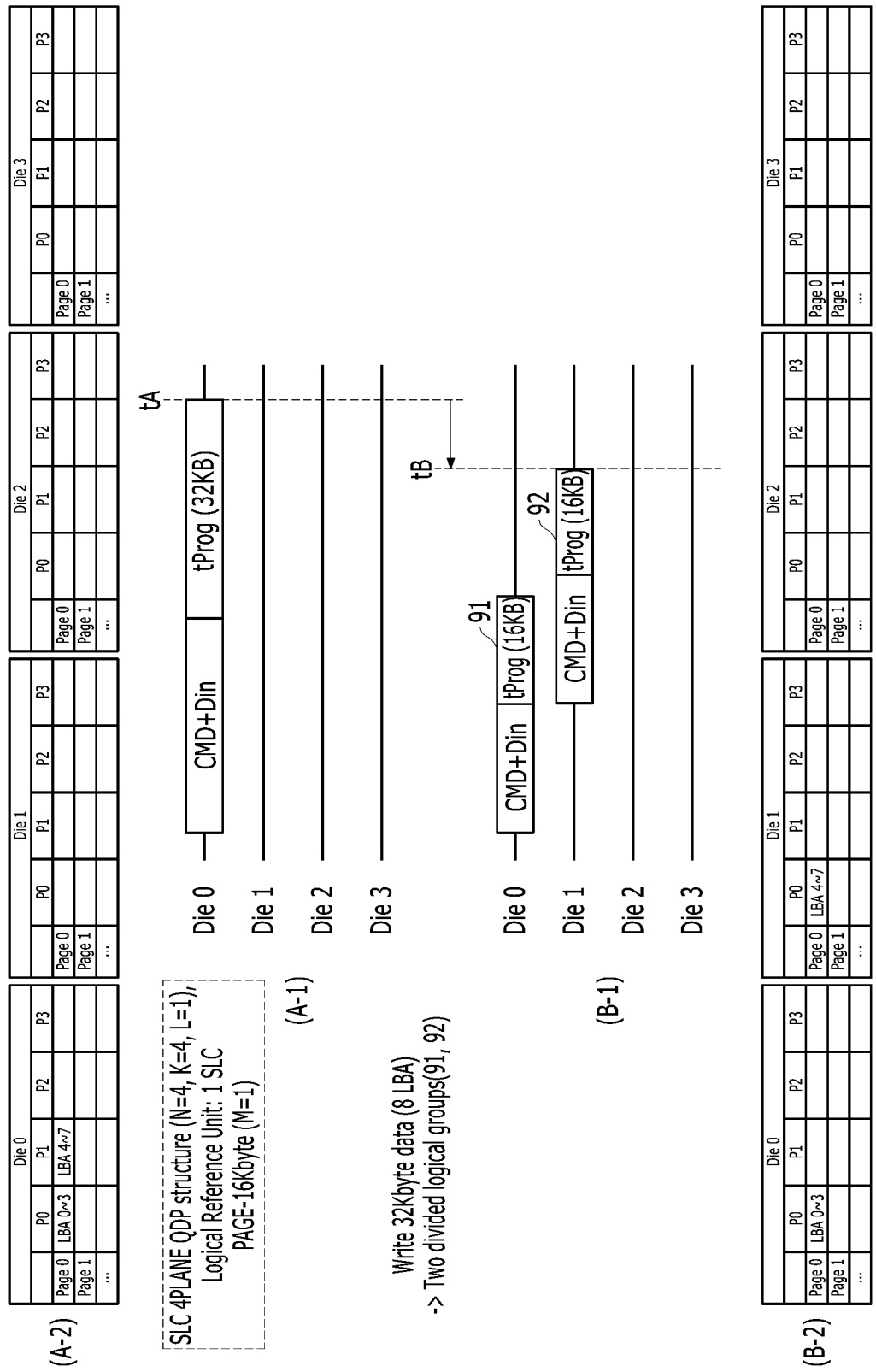
FIGS. 7 to 12 are timing diagrams for describing various examples of an operation of transferring data between the controller and the memory device in the memory system by referring to the internal structure of the memory device illustrated in FIG. 6 in accordance with an embodiment of the present disclosure.

FIG. 7 shows the state in which the partial program operation is not allowed (i.e., P is 1), and the memory device 150 has an SLC 4-plane QDP structure (N=4, K=4, and L=1) as described with reference to FIG. 6, and illustrates the case in which the program operation is performed according to a write request for 32 Kbyte data having eight logical addresses from the host 102.

Specifically, since the write data requested by the host 102 includes eight logical addresses LBA0 to LBA7, the controller 130 may divide the logical addresses into two divided logical groups 91 and 92 by grouping the logical addresses by the number of the memory dies, i.e., 4. That is, the two divided logical groups 91 and 92 may include four logical addresses LBA0 to LBA3 and four logical addresses LBA4 to LBA7, respectively.

Since the memory device 150 has the SLC 4-plane QDP structure including SLC memory cells (L=1), mapping by the first order of the bits of the L-level cell may correspond to one divided logical group.

Since the memory device 150 has the SLC 4-plane QDP structure in which N is 4, mapping by the second order of the N memory dies DIE0, DIE1, DIE2, may correspond to four divided logical groups.

Since the memory device 150 has the SLC 4-plane QDP structure in which K is 4, mapping by the third order of the K planes PLANE0, PLANE1, PLANE2, PLANE3, may correspond to four divided logical groups.

Since N is 4 and L is 1, the reference logical unit may be set to one SLC page (1 SLC PAGE) when the number of the divided logical groups is 4 or less. That is, the number of the divided logical groups 91 and 92 is 2 and therefore the reference logical unit may be set to one SLC page (1 SLC PAGE). Here, a size of the reference logical unit may be 16 Kbyte, which is the size of one SLC page (1 SLC PAGE).

Therefore, the first divided logical group 91 of the two divided logical groups 91 and 92 may be programmed to the first SLC page PAGE0 of the first plane PLANE0 of the first memory die DIE0. Then, the second divided logical group 92 of the two divided logical groups 92 and 92 may be programmed to the first SLC page PAGE0 of the first plane PLANE) of the second memory die DIE1 (B-2).

FIG. 7 also illustrates cases A-1 and A-2 in which the logical addresses of the write data requested by the host 102 are not divided into divided logical groups, but the program operation is performed through a general program method. In this case, the general program method may indicate that program operations are performed in ascending order of units. For example, a page (plane)-based program operation may be performed after a memory cell bit-based program operation, and a memory die-based program operation may be performed after the page (plane)-based program operation.

The write data requested by the host 102 has a size of 32 Kbyte, and one page has a size of 16 Kbyte. Thus, when the program operation is performed through the general program method, the write data requested by the host 102 may be programmed to the first SLC page PAGE0 of the first plane PLANE) of the first memory die DIE0 and the first SLC page PAGE0 of the second plane PLANE1 of the first memory die DIE0 (A-2).

In this way, when the write data of 32 Kbyte, requested by the host 102, are all stored in one memory die DIE0, the program operation may be performed as indicated by a timing diagram of the case A-1.

On the contrary, after the logical addresses of the write data of 32 Kbyte, requested by the host 102, are divided into two divided logical groups 91 and 92 each corresponding to a data size of 16 Kbyte as described above, 16 Kbyte data corresponding to the first divided logical group 91 may be programmed to the first SLC page PAGE0 of the first plane PLANE0 of the first memory die DIE0, and 16 Kbyte data corresponding to the second divided logical group 92 may be programmed to the first SLC page PAGE0 of the first plane PLANE) of the second memory die DIE1. In this case, the program operation may be performed as indicated by a timing diagram of the case B-1.

In this case, FIG. 7 shows that a program time tB required in the timing diagram of the case B-1 is shorter than a program time to required in the timing diagram of the case A-1.

Figure 8:
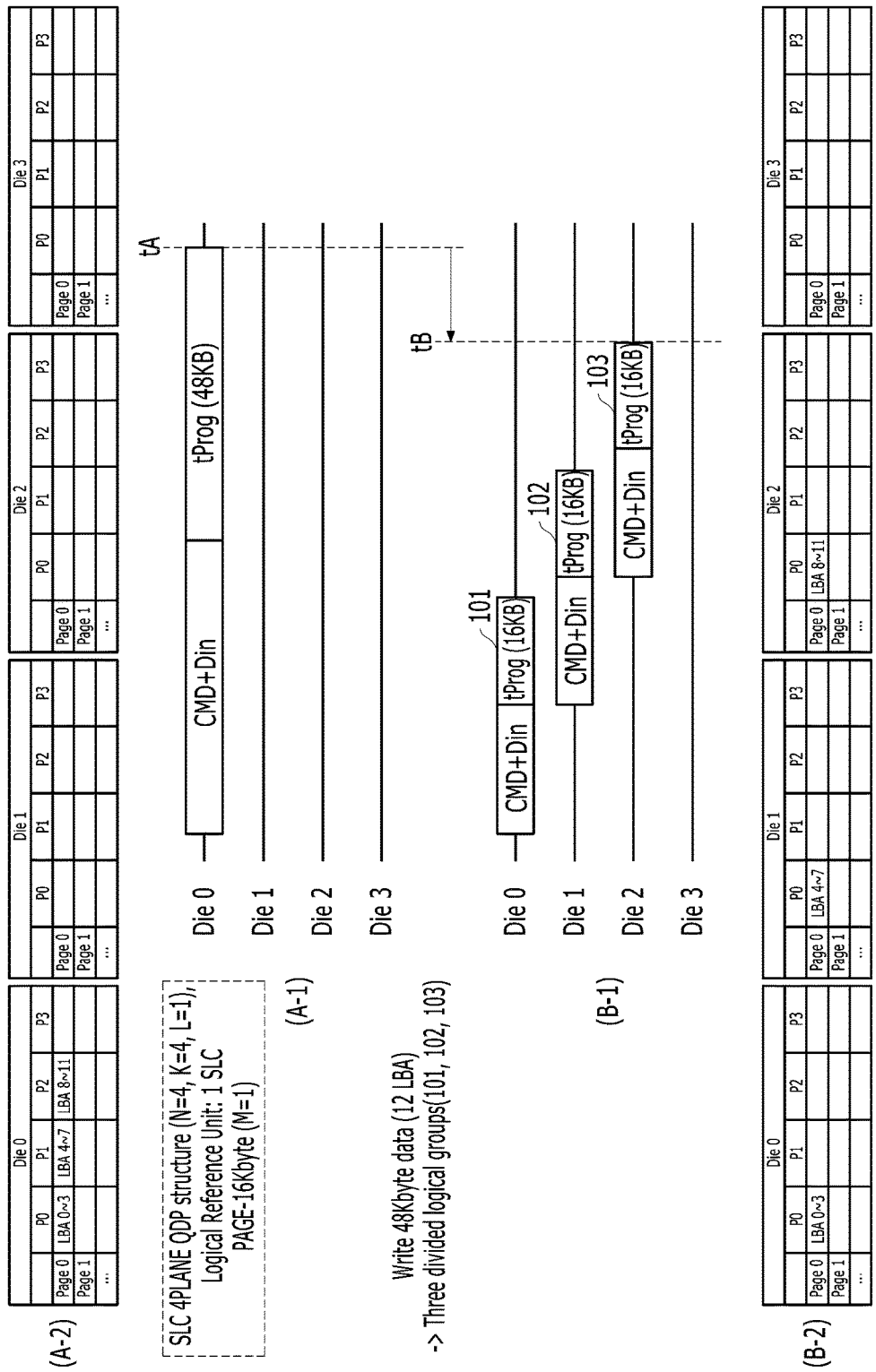

FIG. 8 shows the state in which the partial program operation is not allowed (i.e., P is 1), and the memory device 150 has an SLC 4-plane QDP structure (N=4, K=4, and L=1) as described with reference to FIG. 6, and illustrates the case in which the program operation is performed according to a write request for 48 Kbyte data having 12 logical addresses from the host 102.

Specifically, since the write data requested by the host 102 includes 12 logical addresses LBA0 to LBA11, the controller 130 may divide the logical addresses into three divided logical groups 101 to 103 by grouping the logical addresses by the number of the memory dies, i.e., 4. That is, the three divided logical groups 101 to 103 may include four logical addresses LBA0 to LBA3, four logical addresses LBA4 to LBA7, and four logical addresses LBA8 to LBA11, respectively.

Since the memory device 150 has the SLC 4-plane QDP structure including SLC memory cells (L=1), mapping by the first order of the bits of the L-level cell may correspond to one divided logical group.

Since the memory device 150 has the SLC 4-plane QDP structure in which N is 4, mapping by the second order of the N memory dies DIE0, DIE1, DIE2, . . . may correspond to four divided logical groups.

Since the memory device 150 has the SLC 4-plane QDP structure in which K is 4, mapping by the third order of the K planes PLANE0, PLANE1, PLANE2, PLANE3, . . . may correspond to four divided logical groups.

Since N is 4 and L is 1, the reference logical unit may be set to one SLC page (1 SLC PAGE) when the number of the divided logical groups is 4 or less. That is, the number of the divided logical groups 101, 102 and 103 is 3 and therefore the reference logical unit may be set to one SLC page (1 SLC PAGE). Here, a size of the reference logical unit may be 16 Kbyte, which is the size of one SLC page (1 SLC PAGE).

Therefore, the first divided logical group 101 of the three divided logical groups 101 to 103 may be programmed to the first SLC page PAGE0 of the first plane PLANE) of the first memory die DIE0. Then, the second divided logical group 102 of the three divided logical groups 101 to 103 may be programmed to the first SLC page PAGE0 of the first plane PLANE0 of the second memory die DIE1. Subsequently, the third divided logical group 103 of the three divided logical groups 101 to 103 may be programmed to the first SLC page PAGE0 of the first plane PLANE0 of the third memory die DIE2 (B-2).

FIG. 8 also illustrates cases A-1 and A-2 in which the logical addresses of the write data requested by the host 102 are not divided into divided logical groups, but the program operation is performed through a general program method. In this case, the general program method may indicate that program operations are performed in ascending order of units. For example, a page (plane)-based program operation may be performed after a memory cell bit-based program operation, and a memory die-based program operation may be performed after the page (plane)-based program operation.

The write data requested by the host 102 has a size of 48 Kbyte, and one page has a size of 16 Kbyte. Thus, when the program operation is performed through the general program method, the write data requested by the host 102 may be programmed to the first SLC page PAGE0 of the first plane PLANE) of the first memory die DIE0, the first SLC page PAGE0 of the second plane PLANE1 of the first memory die DIE0, and the first SLC page PAGE0 of the third plane PLANE2 of the first memory die DIE0 (A-2).

In this way, when the write data of 48 Kbyte, requested by the host 102, is all stored in one memory die DIE0, the program operation may be performed as indicated by a timing diagram of the case A-1.

On the contrary, after the logical addresses of the write data of 48 Kbyte, requested by the host 102, are divided into three divided logical groups 101 to 103 each corresponding to a data size of 16 Kbyte as described above, 16 Kbyte data corresponding to the first divided logical group 101 may be programmed to the first SLC page PAGE0 of the first plane PLANE) of the first memory die DIE0, 16 Kbyte data corresponding to the second divided logical group 102 may be programmed to the first SLC page PAGE0 of the first plane PLANE) of the second memory die DIE1, and 16 Kbyte data corresponding to the third divided logical group 103 may be programmed to the first SLC page PAGE0 of the first plane PLANE0 of the third memory die DIE2. In this case, the program operation may be performed as indicated by a timing diagram of the case B-1.

In this case, FIG. 8 shows that a program time tB required in the timing diagram of the case B-1 is shorter than a program time to required in the timing diagram of the case A-1.

Figure 9:
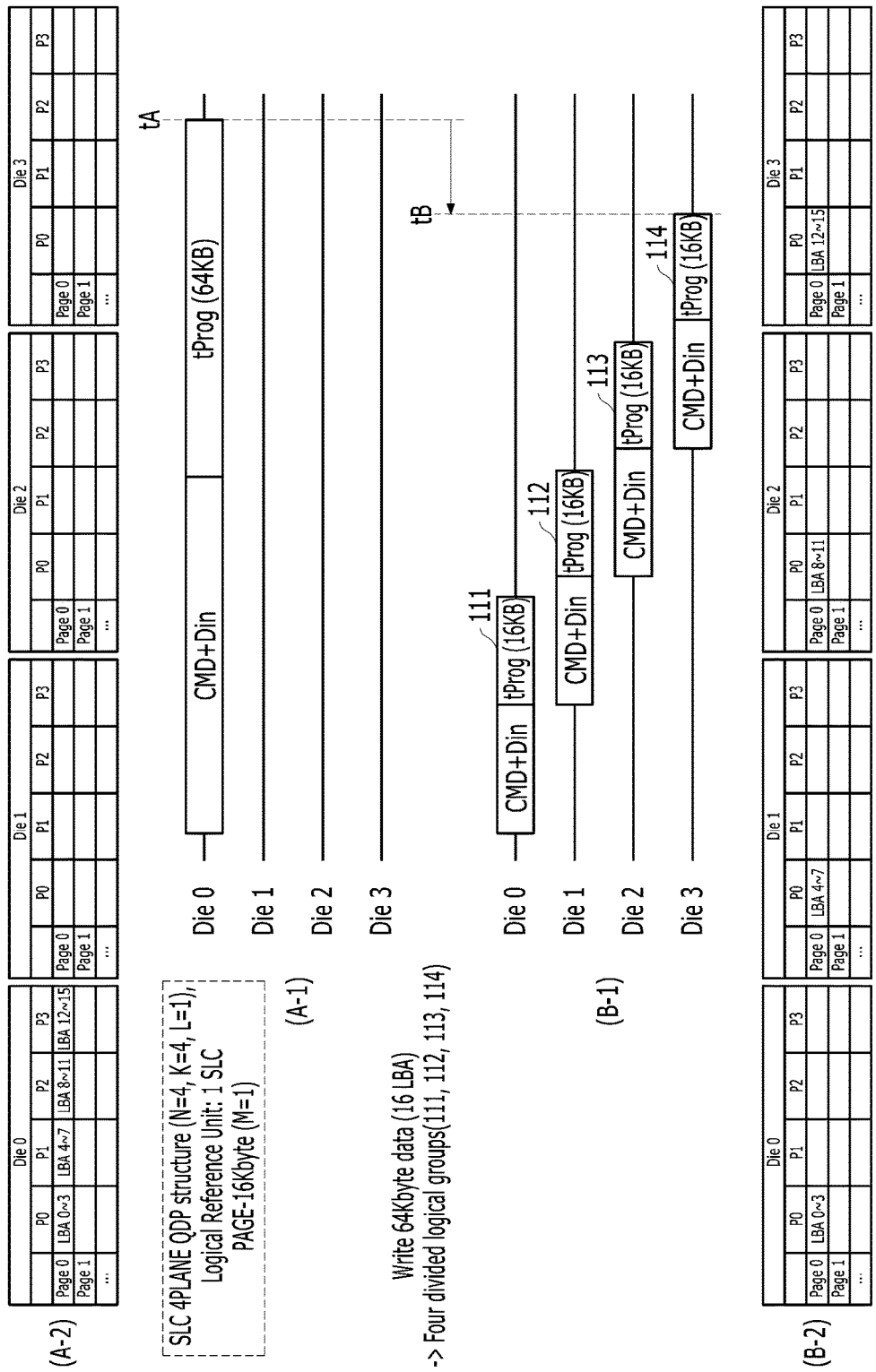

FIG. 9 shows the state in which the partial program operation is not allowed (i.e., P is 1), and the memory device 150 has an SLC 4-plane QDP structure (N=4, K=4, and L=1) as described with reference to FIG. 6, and illustrates the case in which the program operation is performed according to a write request for 64 Kbyte data having 12 logical addresses from the host 102.

Specifically, since the write data requested by the host 102 includes 16 logical addresses LBA0 to LBA15, the controller 130 may divide the logical addresses into four divided logical groups 111 to 114 by grouping the logical addresses by the number of the memory dies, i.e., 4. That is, the four divided logical groups 111 to 114 may include four logical addresses LBA0 to LBA3, four logical addresses LBA4 to LBA7, four logical addresses LBA8 to LBA11, and four logical addresses LBA12 to LBA15, respectively.

Since the memory device 150 has the SLC 4-plane QDP structure including SLC memory cells (L=1), mapping by the first order of the bits of the L-level cell may correspond to one divided logical group.

Since the memory device 150 has the SLC 4-plane QDP structure in which N is 4, mapping by the second order of the N memory dies DIE0, DIE1, DIE2, . . . may correspond to four divided logical groups.

Since the memory device 150 has the SLC 4-plane QDP structure in which K is 4, mapping by the third order of the K planes PLANE0, PLANE1, PLANE2, PLANE3, . . . may correspond to four divided logical groups.

Since N is 4 and L is 1, the reference logical unit may be set to one SLC page (1 SLC PAGE) when the number of the divided logical groups is 4 or less. That is, the number of the divided logical groups 111 to 114 is 4 and therefore the reference logical unit may be set to one SLC page (1 SLC PAGE). Here, a size of the reference logical unit may be 16 Kbyte, which is the size of one SLC page (1 SLC PAGE).

Therefore, the first divided logical group 111 of the four divided logical groups 111 to 114 may be programmed to the first SLC page PAGE0 of the first plane PLANE) of the first memory die DIE0. Then, the second divided logical group 112 of the four divided logical groups 111 to 114 may be programmed to the first SLC page PAGE0 of the first plane PLANE0 of the second memory die DIE1. Then, the third divided logical group 113 of the four divided logical groups 111 to 114 may be programmed to the first SLC page PAGE0 of the first plane PLANE) of the third memory die DIE2. Subsequently, the fourth divided logical group 114 of the four divided logical groups 111 to 114 may be programmed to the first SLC page PAGE0 of the first plane PLANE) of the fourth memory die DIE3 (B-2).

FIG. 9 also illustrates cases A-1 and A-2 in which the logical addresses of the write data requested by the host 102 are not divided into divided logical groups, but the program operation is performed through a general program method. In this case, the general program method may indicate that program operations are performed in ascending order of units. For example, a page (plane)-based program operation may be performed after a memory cell bit-based program operation, and a memory die-based program operation may be performed after the page (plane)-based program operation.

The write data requested by the host 102 has a size of 64 Kbyte, and one page has a size of 16 Kbyte. Thus, when the program operation is performed through the general program method, the write data requested by the host 102 may be programmed to the first SLC page PAGE0 of the first plane PLANE) of the first memory die DIE0, the first SLC page PAGE0 of the second plane PLANE1 of the first memory die DIE0, the first SLC page PAGE0 of the third plane PLANE2 of the first memory die DIE0, and the first SLC page PAGE0 of the fourth plane PLANE3 of the first memory die DIE0 (A-2).

In this way, when the write data of 64 Kbyte, requested by the host 102, is all stored in one memory die DIE0, the program operation may be performed as indicated by a timing diagram of the case A-1.

On the contrary, after the logical addresses of the write data of 64 Kbyte, requested by the host 102, are divided into four divided logical groups 111 to 114 each corresponding to a data size of 16 Kbyte as described above, 16 Kbyte data corresponding to the first divided logical group 111 may be programmed to the first SLC page PAGE0 of the first plane PLANE) of the first memory die DIE0, 16 Kbyte data corresponding to the second divided logical group 112 may be programmed to the first SLC page PAGE0 of the first plane PLANE) of the second memory die DIE1, 16 Kbyte data corresponding to the third divided logical group 113 may be programmed to the first SLC page PAGE0 of the first plane PLANE) of the third memory die DIE2, and 16 Kbyte data corresponding to the fourth divided logical group 114 may be programmed to the first SLC page PAGE0 of the first plane PLANE0 of the fourth memory die DIE3. In this case, the program operation may be performed as indicated by a timing diagram of the case B-1.

In this case, FIG. 9 shows that a program time tB required in the timing diagram of the case B-1 is shorter than a program time to required in the timing diagram of the case A-1.

Figure 10:
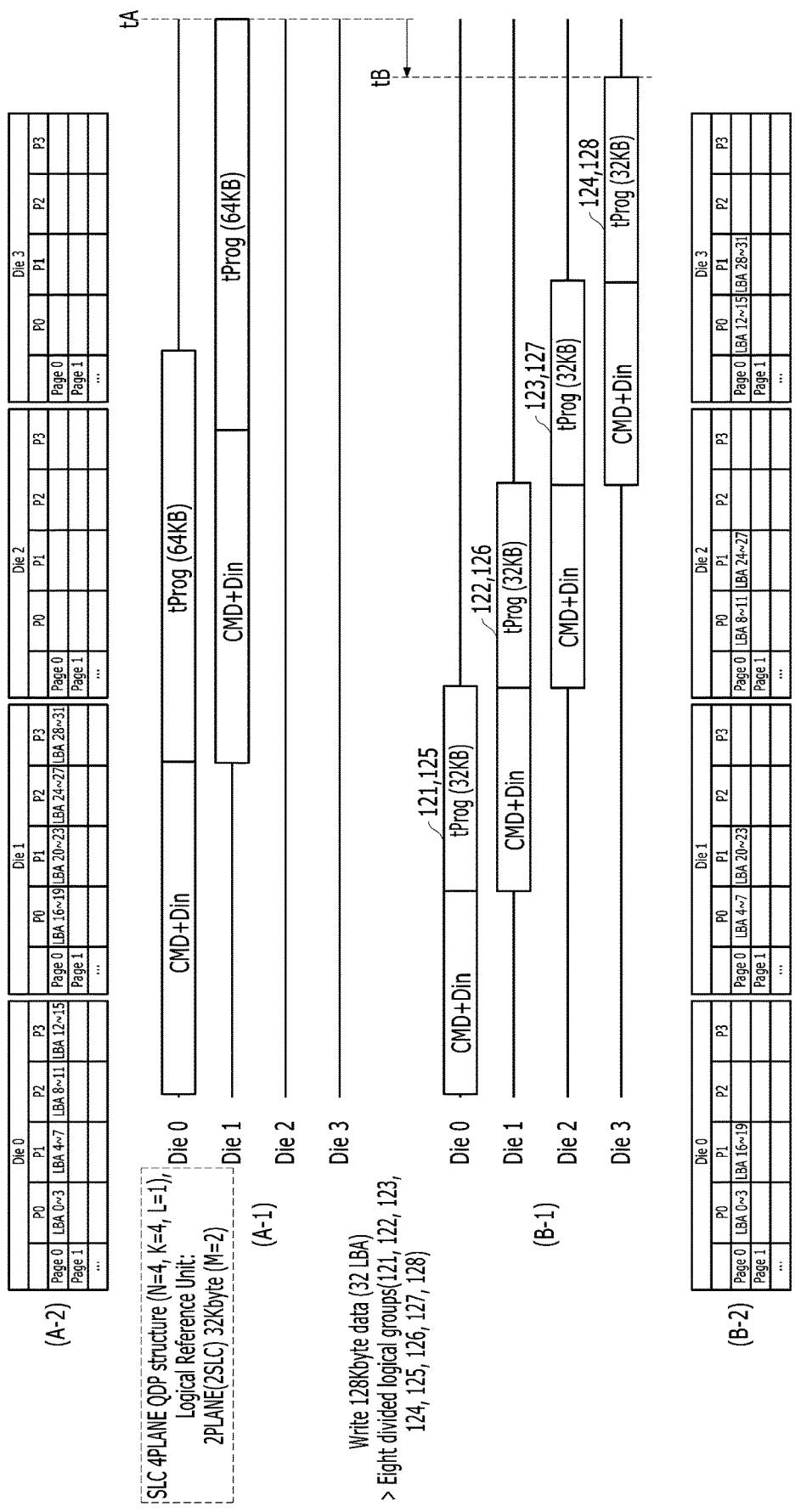

FIG. 10 shows the state in which the partial program operation is not allowed (i.e., P is 1), and the memory device 150 has an SLC 4-plane QDP structure (N=4, K=4, and L=1) as described with reference to FIG. 6, and illustrates the case in which the program operation is performed according to a write request for 128 Kbyte data having 32 logical addresses from the host 102.

Specifically, since the write data requested by the host 102 includes 32 logical addresses LBA0 to LBA31, the controller 130 may divide the logical addresses into eight divided logical groups 121 to 128 by grouping the logical addresses by the number of the memory dies, i.e., 4. That is, the eight divided logical groups 121 to 128 may include four logical addresses LBA0 to LBA3, four logical addresses LBA4 to LBA7, four logical addresses LBA8 to LBA11, four logical addresses LBA12 to LBA15, four logical addresses LBA16 to LBA19, four logical addresses LBA20 to LBA23, four logical addresses LBA24 to LBA27, and four logical addresses LBA28 to LBA31.

Since the memory device 150 has the SLC 4-plane QDP structure including SLC memory cells (L=1), mapping by the first order of the bits of the L-level cell may correspond to one divided logical group.

Since the memory device 150 has the SLC 4-plane QDP structure in which N is 4, mapping by the second order of the N memory dies DIE0, DIE1, DIE2, . . . may correspond to four divided logical groups.

Since the memory device 150 has the SLC 4-plane QDP structure in which K is 4, mapping by the third order of the K planes PLANE0, PLANE1, PLANE2, PLANE3, . . . may correspond to four divided logical groups.

Since N is 4 and L is 1, the reference logical unit may be set to two SLC pages (2 SLC PAGES) when the number of the divided logical groups is greater than 4 and equal to or less than 8. That is, the number of the divided logical groups 121 to 128 is 8 and therefore the reference logical unit may be set to two SLC pages (2 SLC PAGES). Here, a size of the reference logical unit may be 32 Kbyte, which is the size of two SLC pages (2 SLC PAGES).

Therefore, the first divided logical group 121 of the eight divided logical groups 121 to 128 may be programmed to the first SLC page PAGE0 of the first plane PLANE) of the first memory die DIE0. Then, the second divided logical group 122 of the eight divided logical groups 121 to 128 may be programmed to the first SLC page PAGE0 of the first plane PLANE0 of the second memory die DIE1. Then, the third divided logical group 123 of the eight divided logical groups 121 to 128 may be programmed to the first SLC page PAGE0 of the first plane PLANE0 of the third memory die DIE2. Then, the fourth divided logical group 124 of the eight divided logical groups 121 to 128 may be programmed to the first SLC page PAGE0 of the first plane PLANE) of the fourth memory die DIE3. Then, the fifth divided logical group 125 of the eight divided logical groups 121 to 128 may be programmed to the first SLC page PAGE0 of the second plane PLANE1 of the first memory die DIE0. Then, the sixth divided logical group 126 of the eight divided logical groups 121 to 128 may be programmed to the first SLC page PAGE0 of the second plane PLANE1 of the second memory die DIE1. Then, the seventh divided logical group 127 of the eight divided logical groups 121 to 128 may be programmed to the first SLC page PAGE0 of the second plane PLANE1 of the third memory die DIE2. Then, the eighth divided logical group 128 of the eight divided logical groups 121 to 128 may be programmed to the first SLC page PAGE0 of the second plane PLANE1 of the fourth memory die DIE3 (B-2).

FIG. 10 also illustrates cases A-1 and A-2 in which the logical addresses of the write data requested by the host 102 are not divided into divided logical groups, but the program operation is performed through a general program method. In this case, the general program method may indicate that program operations are performed in ascending order of units. For example, a page (plane)-based program operation may be performed after a memory cell bit-based program operation, and a memory die-based program operation may be performed after the page (plane)-based program operation.

The write data requested by the host 102 has a size of 128 Kbyte, and one page has a size of 16 Kbyte. Thus, when the program operation is performed through the general program method, the write data requested by the host 102 may be programmed to the first SLC pages PAGE0 of the first to fourth planes PLANE0, PLANE1, PLANE2, and PLANE3 of the first memory die DIE0 and the first SLC pages PAGE0 of the first to fourth planes PLANE0, PLANE1, PLANE2, and PLANE3 of the second memory die DIE1 (A-2).

In this way, when the write data of 128 Kbyte, requested by the host 102, is stored in two memory dies DIE0 and DIE1, the program operation may be performed as indicated by a timing diagram of the case A-1.

On the contrary, after the logical addresses of the write data of 128 Kbyte, requested by the host 102, are divided into eight divided logical groups 121 to 128 each corresponding to a data size of 16 Kbyte as described above, 32 Kbyte data corresponding to the first and fifth divided logical group 121 and 125 may be programmed to the first SLC pages PAGE0 of the first and second planes PLANE) and PLANE1 of the first memory die DIE0, 32 Kbyte data corresponding to the second and sixth divided logical groups 122 and 126 may be programmed to the first SLC pages PAGE0 of the first and second planes PLANE) and PLANE1 of the second memory die DIE1, 32 Kbyte data corresponding to the third and seventh divided logical groups 123 and 127 may be programmed to the first SLC pages PAGE0 of the first and second planes PLANE) and PLANE1 of the third memory die DIE2, and 32 Kbyte data corresponding to the fourth and eighth divided logical groups 124 and 128 may be programmed to the first SLC pages PAGE0 of the first and second planes PLANE0 and PLANE1 of the fourth memory die DIE3. In this case, the program operation may be performed as indicated by a timing diagram of the case B-1.

In this case, FIG. 10 shows that a program time tB required in the timing diagram of the case B-1 is shorter than a program time to required in the timing diagram of the case A-1.

Figure 11:
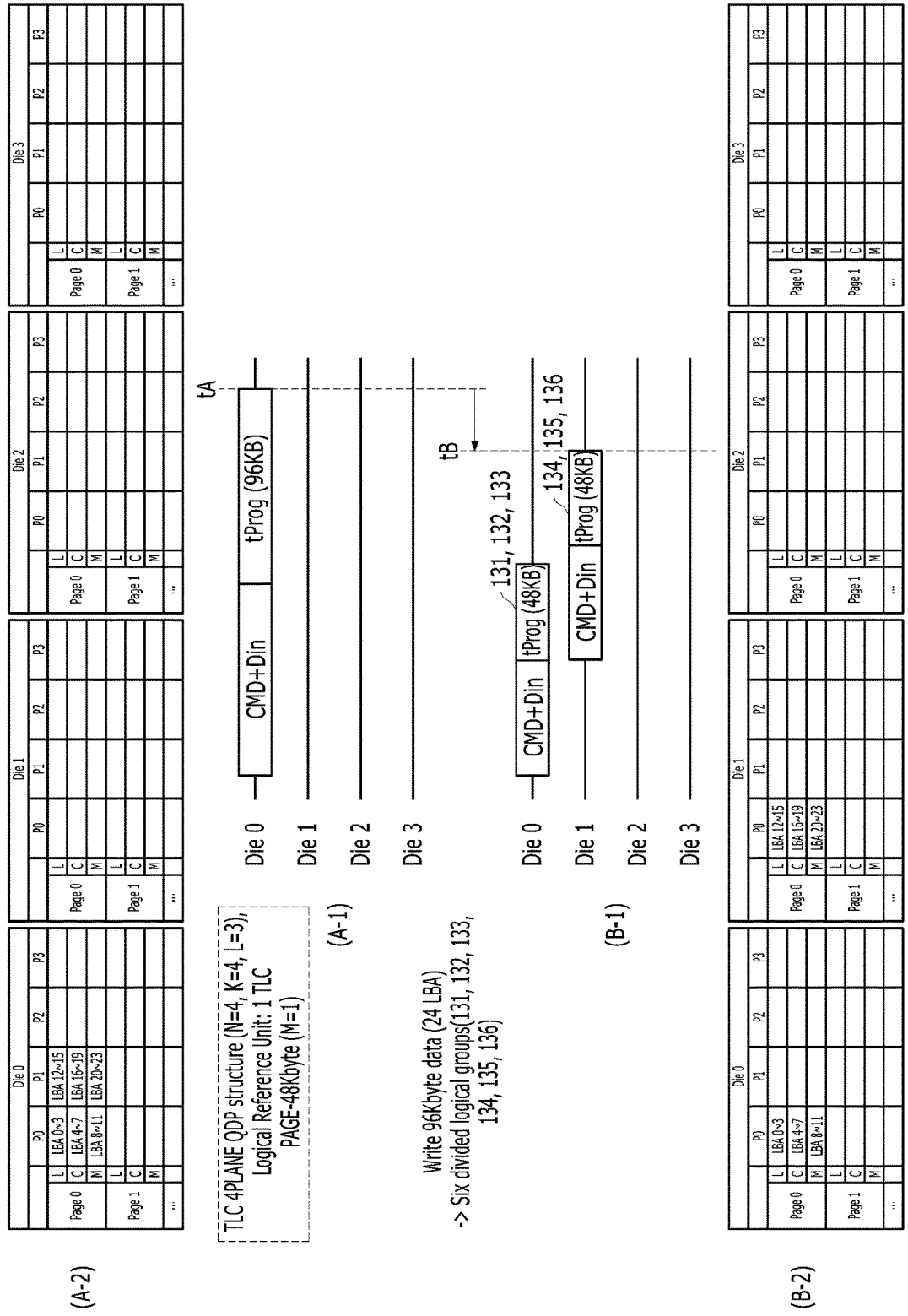

FIG. 11 shows the state in which the partial program operation is not allowed (i.e., P is 1), and the memory device 150 has a TLC 4-plane QDP structure (N=4, K=4, and L=3) as described with reference to FIG. 6, and illustrates the case in which the program operation is performed according to a write request for 96 Kbyte data having 24 logical addresses from the host 102.

Specifically, since the write data requested by the host 102 includes 24 logical addresses LBA0 to LBA23, the controller 130 may divide the logical addresses into six divided logical groups 131 to 136 by grouping the logical addresses by the number of the memory dies, i.e., 4. That is, the six divided logical groups 131 to 136 may include four logical addresses LBA0 to LBA3, four logical addresses LBA4 to LBA7, four logical addresses LBA8 to LBA11, four logical addresses LBA12 to LBA15, four logical addresses LBA16 to LBA19, and four logical addresses LBA20 to LBA23, respectively.

Since the memory device 150 has the TLC 4-plane QDP structure including TLC memory cells (L=3), mapping by the first order of the bits of the L-level cell may correspond to three divided logical groups.

Since the memory device 150 has the TLC 4-plane QDP structure in which N is 4, mapping by the second order of the N memory dies DIE0, DIE1, DIE2, . . . may correspond to four divided logical groups.

Since the memory device 150 has the TLC 4-plane QDP structure in which K is 4, mapping by the third order of the K planes PLANE0, PLANE1, PLANE2, PLANE3, . . . may correspond to four divided logical groups.

Since N is 4 and L is 3, the reference logical unit may be set to one TLC page (1 TLC PAGE) when the number of the divided logical groups is 12 or less. That is, the number of the divided logical groups 131 to 136 is 6 and therefore the reference logical unit may be set to one TLC page (1 TLC PAGE). Here, a size of the reference logical unit may be 48 Kbyte, which is the size of one TLC page (1 TLC PAGE).

Therefore, the first to third divided logical groups 131 to 133 of the six divided logical groups 131 to 136 may be programmed to the first TLC page PAGE0 of the first plane PLANE) of the first memory die DIE0. Then, the fourth to sixth divided logical groups 134 to 136 of the six divided logical groups 131 to 136 may be programmed to the first TLC page PAGE0 of the first plane PLANE0 of the second memory die DIE1 (B-2).

FIG. 11 also illustrates cases A-1 and A-2 in which the logical addresses of the write data requested by the host 102 are not divided into divided logical groups, but the program operation is performed through a general program method. In this case, the general program method may indicate that program operations are performed in ascending order of units. For example, a page (plane)-based program operation may be performed after a memory cell bit-based program operation, and a memory die-based program operation may be performed after the page (plane)-based program operation.

The write data requested by the host 102 has a size of 96 Kbyte, and one page has a size of 48 Kbyte. Thus, when the program operation is performed through the general program method, the write data requested by the host 102 may be programmed to the first TLC page PAGE0 of the first plane PLANE) of the first memory die DIE0 and the first TLC page PAGE0 of the second plane PLANE1 of the first memory die DIE0 (A-2).

In this way, when the write data of 96 Kbyte, requested by the host 102, is all stored in one memory die DIE0, the program operation may be performed as indicated by a timing diagram of the case A-1.

On the contrary, after the logical addresses of the write data of 96 Kbyte, requested by the host 102, are divided into six divided logical groups 131 to 136 each corresponding to a data size of 16 Kbyte as described above, 48 Kbyte data corresponding to the first to third divided logical groups 131 to 133 may be programmed to the first TLC page PAGE0 of the first plane PLANE) of the first memory die DIE0, and 48 Kbyte data corresponding to the fourth to sixth divided logical groups 134 to 136 may be programmed to the first TLC page PAGE0 of the first plane PLANE0 of the second memory die DIE1. In this case, the program operation may be performed as indicated by a timing diagram of the case B-1.

In this case, FIG. 11 shows that a program time tB required in the timing diagram of the case B-1 is shorter than a program time to required in the timing diagram of the case A-1.

Figure 12:
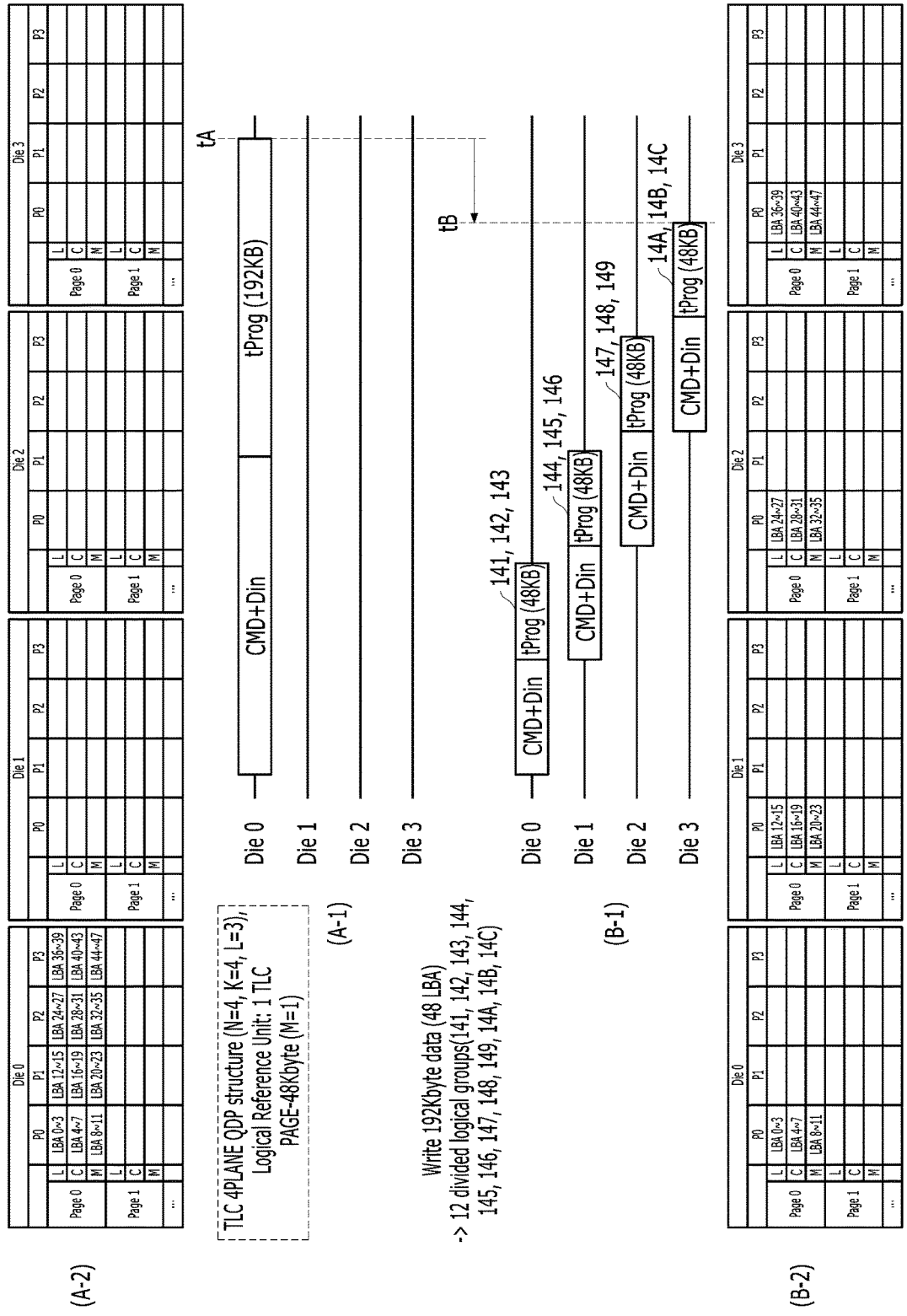

FIG. 12 shows the state in which the partial program operation is not allowed (i.e., P is 1), and the memory device 150 has a TLC 4-plane QDP structure (N=4, K=4, and L=3) as described with reference to FIG. 6, and illustrates the case in which the program operation is performed according to a write request for 192 Kbyte data having 48 logical addresses from the host 102.

Specifically, since the write data requested by the host 102 includes 48 logical addresses LBA0 to LBA47, the controller 130 may divide the logical addresses into 12 divided logical groups 141, 142, 143, 144, 145, 146, 147, 148, 149, 14A, 14B, and 14C by grouping the logical addresses by the number of the memory dies, i.e., 4. That is, the 12 divided logical groups 141, 142, 143, 144, 145, 146, 147, 148, 149, 14A, 14B, and 14C may include four logical addresses LBA0 to LBA3, four logical addresses LBA4 to LBA7, four logical addresses LBA8 to LBA11, four logical addresses LBA12 to LBA15, four logical addresses LBA16 to LBA19, four logical addresses LBA20 to LBA23, four logical addresses LBA24 to LBA27, and four logical addresses LBA28 to LBA31, four logical addresses LBA32 to LBA35, four logical addresses LBA36 to LBA39, four logical addresses LBA40 to LBA43, and four logical addresses LBA44 to LBA47, respectively.

Since the memory device 150 has the TLC 4-plane QDP structure including TLC memory cells (L=3), mapping by the first order of the bits of the L-level cell may correspond to three divided logical groups.

Since the memory device 150 has the TLC 4-plane QDP structure in which N is 4, mapping by the second order of the N memory dies DIE0, DIE1, DIE2, . . . may correspond to four divided logical groups.

Since the memory device 150 has the TLC 4-plane QDP structure in which K is 4, mapping by the third order of the K planes PLANE0, PLANE1, PLANE2, PLANE3, . . . may correspond to four divided logical groups.

Since N is 4 and L is 3, the reference logical unit may be set to one TLC page (1 TLC PAGE) when the number of the divided logical groups is 12 or less. That is, the number of the divided logical groups 141 to 14C is 12 and therefore the reference logical unit may be set to one TLC page (1 TLC PAGE). Here, a size of the reference logical unit may be 48 Kbyte, which is the size of one TLC page (1 TLC PAGE).

Therefore, the first to third divided logical groups 141 to 143 of the 12 divided logical groups 141, 142, 143, 144, 145, 146, 147, 148, 149, 14A, 14B, and 14C may be programmed to the first TLC page PAGE0 of the first plane PLANE) of the first memory die DIE0. Then, the fourth to sixth divided logical groups 144 to 146 of the 12 divided logical groups 141, 142, 143, 144, 145, 146, 147, 148, 149, 14A, 14B, and 14C may be programmed to the first TLC page PAGE0 of the first plane PLANE0 of the second memory die DIE1. Then, the seventh to ninth divided logical groups 147 to 149 of the 12 divided logical groups 141, 142, 143, 144, 145, 146, 147, 148, 149, 14A, 14B, and 14C may be programmed to the first TLC page PAGE0 of the first plane PLANE) of the third memory die DIE2. Then, the tenth to 12th divided logical groups 14A, 14B, and 14C of the 12 divided logical groups 141, 142, 143, 144, 145, 146, 147, 148, 149, 14A, 14B, and 14C may be programmed to the first TLC page PAGE0 of the first plane PLANE) of the fourth memory die DIE3 (B-2).

FIG. 12 also illustrates cases A-1 and A-2 in which the logical addresses of the write data requested by the host 102 are not divided into divided logical groups, but the program operation is performed through a general program method. In this case, the general program method may indicate that program operations are performed in ascending order of units. For example, a page (plane)-based program operation may be performed after a memory cell bit-based program operation, and a memory die-based program operation may be performed after the page (plane)-based program operation.

The write data requested by the host 102 has a size of 192 Kbyte, and one page has a size of 48 Kbyte. Thus, when the program operation is performed through the general program method, the write data requested by the host 102 may be programmed to the first TLC page PAGE0 of the first plane PLANE) of the first memory die DIE0, the first TLC page PAGE0 of the second plane PLANE1 of the first memory die DIE0, the first TLC page PAGE0 of the third plane PLANE2 of the first memory die DIE0, and the first TLC page PAGE0 of the fourth plane PLANE3 of the first memory die DIE0 (A-2).

In this way, when the write data of 192 Kbyte, requested by the host 102, is all stored in one memory die DIE0, the program operation may be performed as indicated by a timing diagram of the case A-1.

On the contrary, after the logical addresses of the write data of 192 Kbyte, requested by the host 102, are divided into 12 divided logical groups 141, 142, 143, 144, 145, 146, 147, 148, 149, 14A, 14B, and 14C each corresponding to a data size of 16 Kbyte as described above, 48 Kbyte data corresponding to the first to third divided logical groups 141 to 143 may be programmed to the first TLC page PAGE0 of the first plane PLANE) of the first memory die DIE0, 48 Kbyte data corresponding to the fourth to sixth divided logical groups 144 to 146 may be programmed to the first TLC page PAGE0 of the first plane PLANE0 of the second memory die DIE1, 48 Kbyte data corresponding to the seventh to ninth divided logical groups 147 to 149 may be programmed to the first TLC page PAGE0 of the first plane PLANE0 of the third memory die DIE2, and 48 Kbyte data corresponding to the tenth to 12th divided logical groups 14A, 14B, and 14C may be programmed to the first TLC page PAGE0 of the first plane PLANE0 of the fourth memory die DIE3. In this case, the program operation may be performed as indicated by a timing diagram of the case B-1.

In this case, FIG. 12 shows that a program time tB required in the timing diagram of the case B-1 is shorter than a program time to required in the timing diagram of the case A-1.

Figure 13:
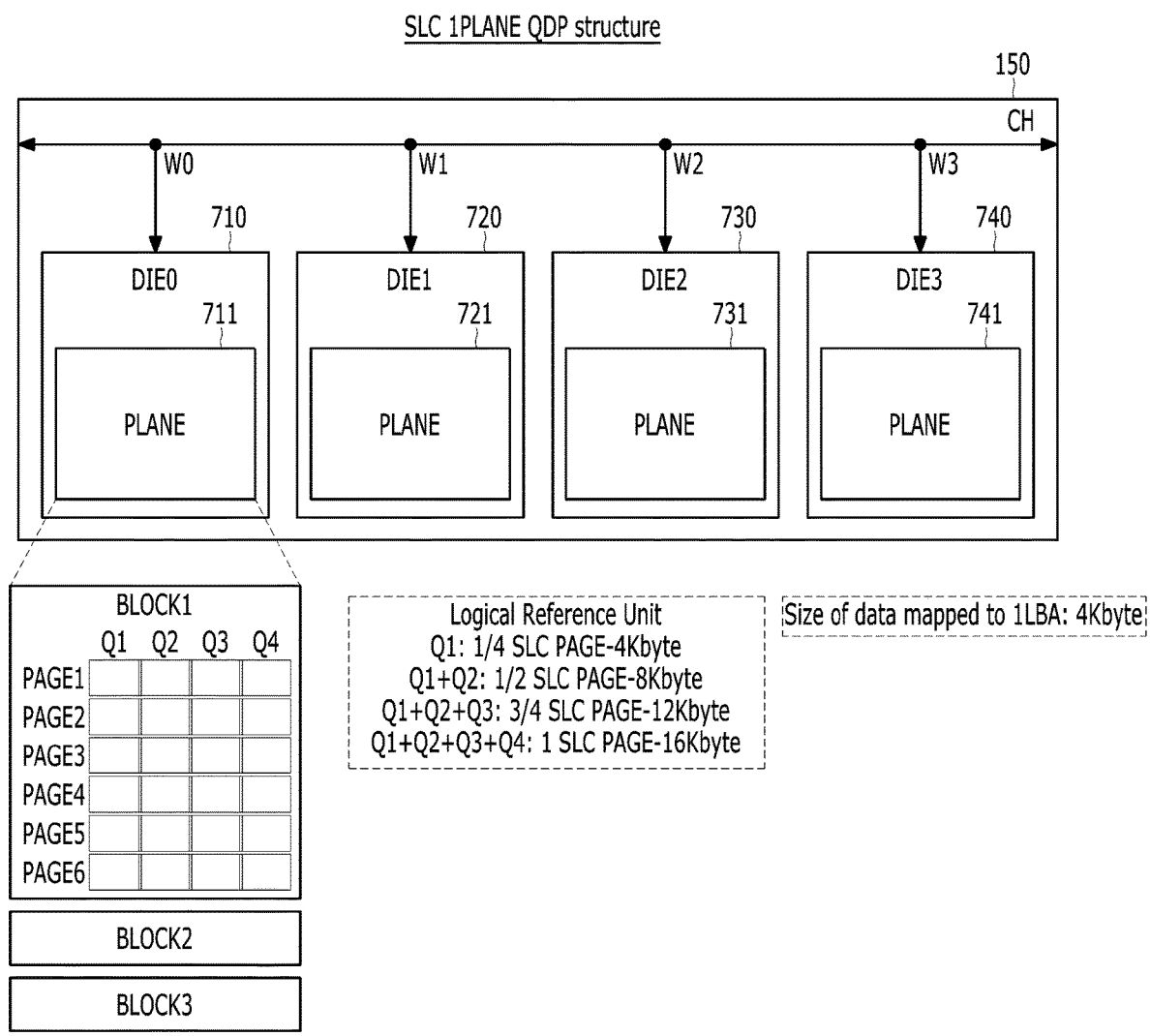
FIG. 13 is a diagram schematically illustrating another example of the internal structure of the memory device in accordance with an embodiment of the present disclosure.

FIG. 13 is a diagram schematically illustrating another example of the internal structure of the memory device in accordance with an embodiment of the present disclosure.

FIG. 13 may be based on that N is 4 and K and L are each 1 in the internal configuration of the memory device 150 in FIG. 5. Furthermore, FIG. 13 may be based on that the partial program operation is allowed (i.e., P is greater than 1), and the number P of partial program operations is 4. That is, since ¼ partial program operation is allowed (i.e., P is 4 greater than 1), one page may be divided by at least four such that a maximum of four partial program operations are performed.

Specifically, FIG. 13 discloses an SLC 1-plane QDP structure in which the memory device 150 includes four memory dies 710, 720, 730, and 740, and the four memory dies 710, 720, 730, and 740 are coupled to one channel CH through four ways W0, W1, W2, and W3, respectively, and includes four planes 711, 721, 731, and 741, respectively, each including a plurality of SLCs.

Since the four memory dies 710, 720, 730, and 740 are coupled to one channel CH through the four ways W0, W1, W2, and W3, respectively, in the SLC 1-plane QDP structure, the four memory dies 710, 720, 730, and 740 may be operated in an interleaving manner, and the planes 711, 721, 731, and 741 included in the four memory dies 710, 720, 730, and 740, respectively, may be each operated in an interleaving manner. The ¼ partial program operation may not be performed in an interleaving manner.

More specifically, one page corresponds to four logical addresses LBA, and the size of data mapped to one logical address (1 LBA) is 4 Kbyte. Furthermore, since the ¼ partial program operation is allowed (i.e., P is 4 greater than 1), the smallest reference logical unit may correspond to a quarter page obtained by dividing one page by four.

The size of data mapped to a reference logical unit Q1 including a quarter SLC page (¼ SLC PAGE) may be 4 Kbyte, the size of data mapped to a reference logical unit Q1+Q2 including a half SLC page (½ SLC PAGE) may be 8 Kbyte, the size of data mapped to a reference logical unit Q1+Q2+Q3 including ¾ SLC page (¾ SLC PAGE) may be 12 Kbyte, and the size of data mapped to a reference logical unit Q1+Q2+Q3+Q4 including one SLC page (1 SLC PAGE) may be 16 Kbyte.

For reference, FIG. 13 discloses the structure in which the memory device 150 includes the four memory dies 710, 720, 730, and 740, and the four memory dies 710, 720, 730, and 740 are coupled to one channel through the four ways W0, W1, W2, and W3, respectively, but this is only an embodiment. That is, in accordance with various embodiments, the memory device 150 may include various numbers of memory dies, e.g., two or eight memory dies, various numbers of channels, e.g., one to five channels, may be provided, and various numbers of ways, e.g., one to five ways may be provided depending on how many dies are coupled to one channel. That is, the numbers of memory dies, channels, and ways within the memory device 150 can be changed in design according to the purpose of use and the performance requirement of the memory system.

Figure 14:
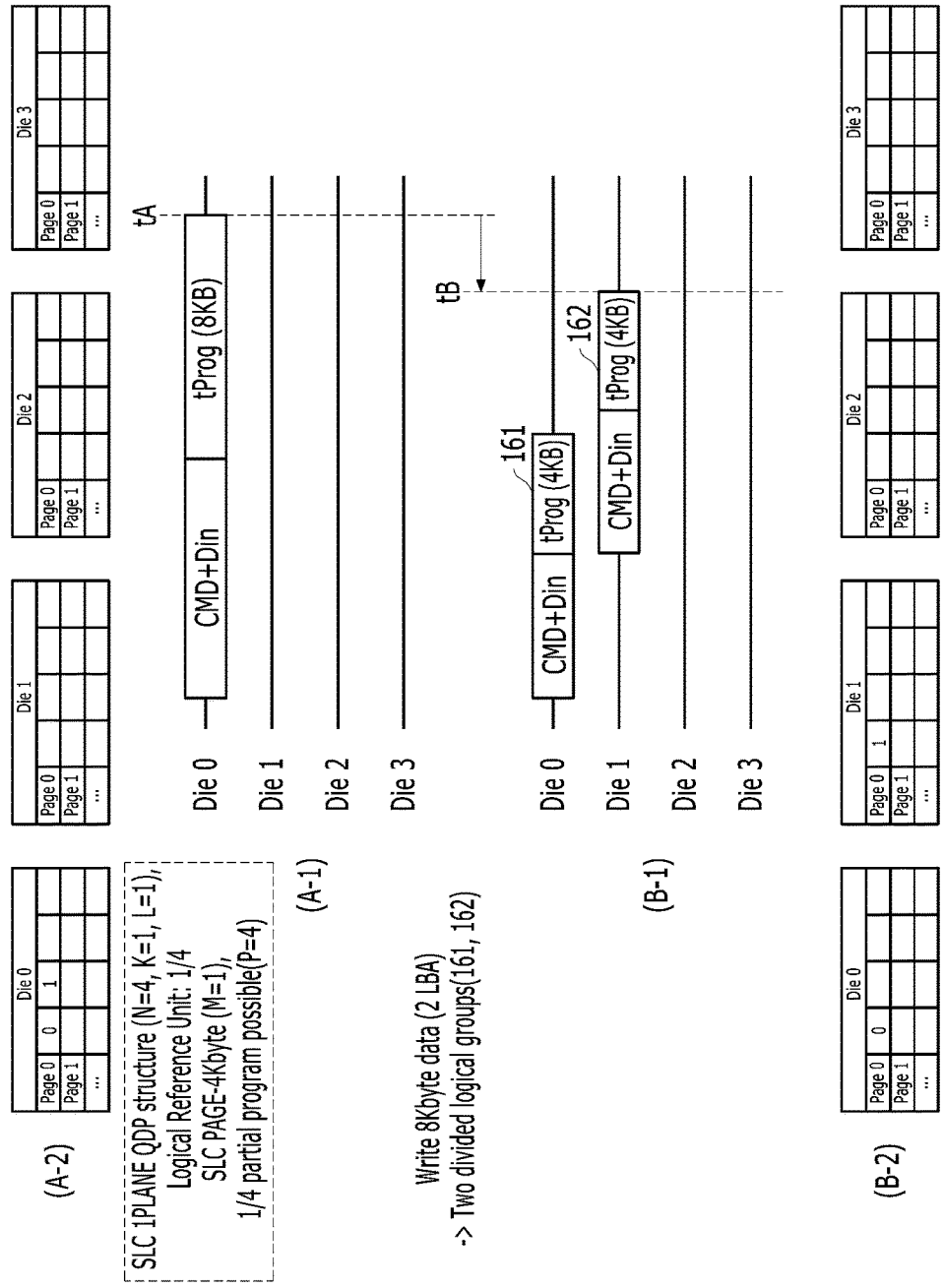
FIGS. 14 to 16 are timing diagrams for describing various examples of an operation of transferring data between the controller and the memory device in the memory system by referring to the internal structure of the memory device illustrated in FIG. 13 in accordance with an embodiment of the present disclosure.
Figure 15:
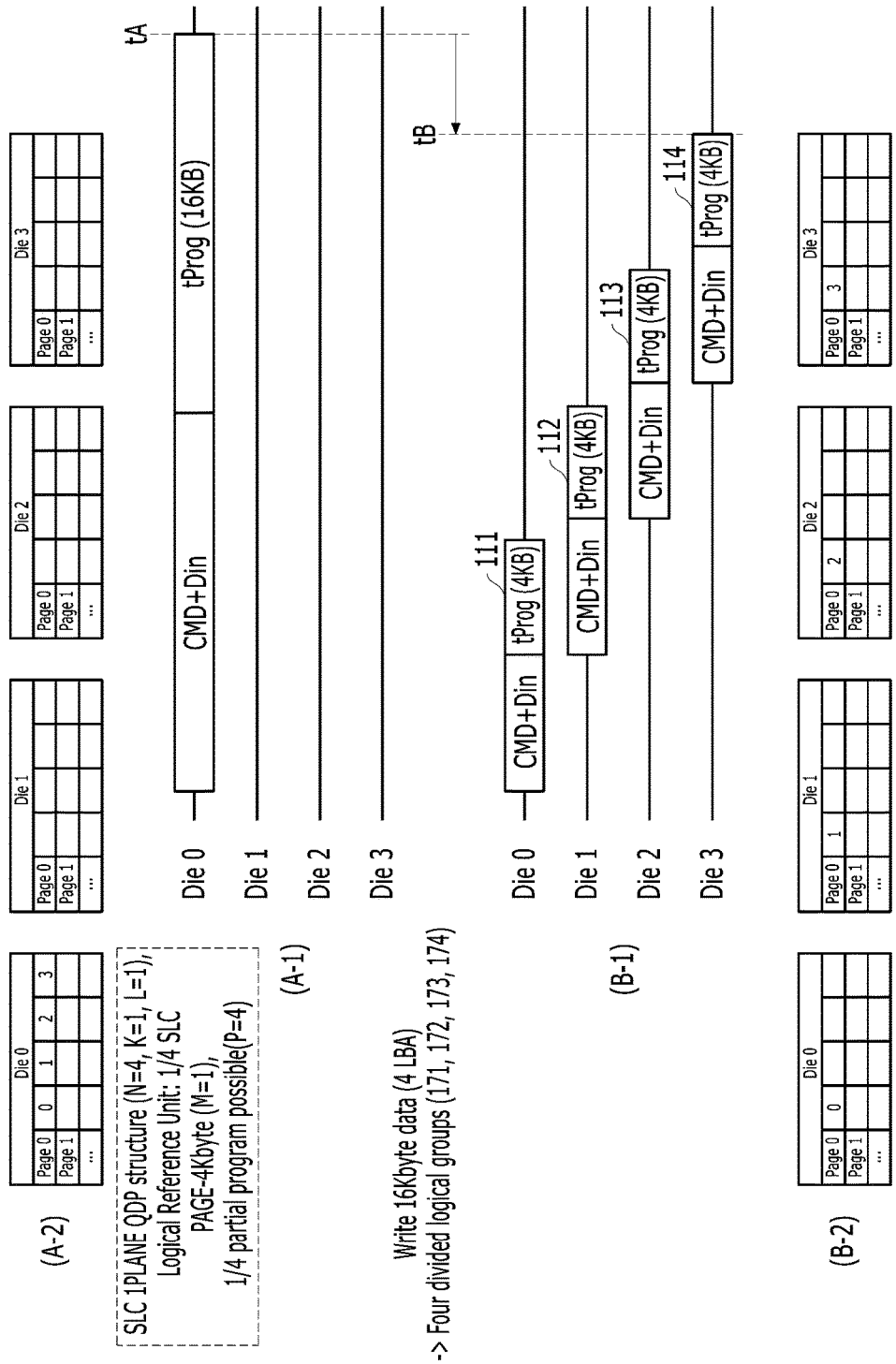
Figure 16:
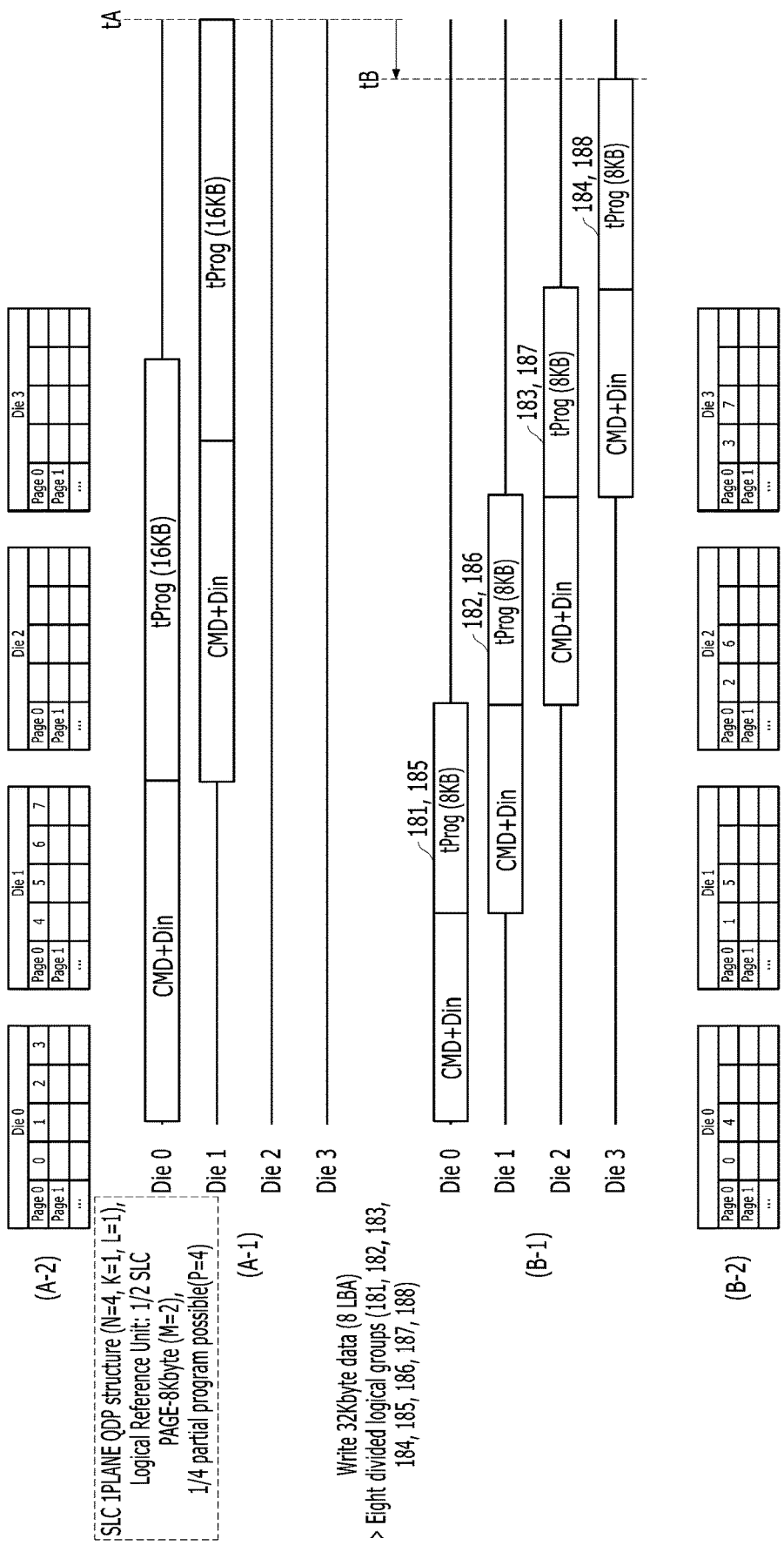

FIGS. 14 to 16 are timing diagrams for describing various examples of an operation of transferring data between the controller and the memory device in the memory system by referring to the internal structure of the memory device illustrated in FIG. 13 in accordance with an embodiment of the present disclosure.

FIG. 14 shows the state in which the ¼ partial program operation is allowed (i.e., P is 4 greater than 1), and the memory device 150 has an SLC 1-plane QDP structure (N=4, K=1, and L=1) as described with reference to FIG. 13, and illustrates the case in which the program operation is performed according to a write request for 8 Kbyte data having two logical addresses from the host 102.

Specifically, since the write data requested by the host 102 includes two logical addresses LBA0 and LBA1, the controller 130 may divide the two logical addresses LBA0 and LBA1 into two divided logical groups 161 and 162 by dividing the two logical addresses LBA0 and LBA1, included in the write data, by 1 which is a quotient obtained by dividing the number of memory dies, i.e., 4, by the number of partial program operations, i.e., 4. That is, the two divided logical groups 161 and 162 may include one logical address LBA0 and one logical address LBA1, respectively.

Since the memory device 150 has the SLC 1-plane QDP structure including SLC memory cells (L=1), mapping by the first order of the bits of the L-level cell may correspond to one divided logical group.

Since the memory device 150 has the SLC 1-plane QDP structure in which N is 4, mapping by the second order of the N memory dies DIE0, DIE1, DIE2, . . . may correspond to four divided logical groups.

Since the memory device 150 has the SLC 1-plane structure in which K is 1, mapping by the third order of the K planes may correspond to one divided logical group.

Since N is 4, L is 1 and P is 4, the reference logical unit may be set to a quarter SLC page (¼ SLC PAGE) when the number of the divided logical groups is 4 or less. That is, the number of the divided logical groups 161 and 162 is 2 and therefore the reference logical unit may be set to a quarter SLC page (¼ SLC PAGE). Here, a size of the reference logical unit may be 4 Kbyte, which is the size of a quarter SLC page (¼ SLC PAGE).

Therefore, the first divided logical group 161 of the two divided logical groups 161 and 162 may be programmed to a first quarter part of the first SLC page PAGE0 of the first memory die DIE0. Then, the second divided logical group 162 of the two divided logical groups 161 and 162 may be programmed to a first quarter part of the first SLC page PAGE0 of the second memory die DIE1 (B-2).

FIG. 14 also illustrates cases A-1 and A-2 in which the logical addresses of the write data requested by the host 102 are not divided into divided logical groups, but the program operation is performed through a general program method. In this case, the general program method may indicate that program operations are performed in ascending order of units. For example, a page (plane)-based program operation may be performed after a memory cell bit-based program operation, and a memory die-based program operation may be performed after the page (plane)-based program operation.

The write data requested by the host 102 has a size of 8 Kbyte, and one page has a size of 16 Kbyte. Thus, when the program operation is performed through the general program method, the write data requested by the host 102 may be programmed to first and second quarter parts, i.e., a half part of the first SLC page PAGE0 of the first memory die DIE0 (A-2).

In this way, when the write data of 8 Kbyte, requested by the host 102, is all stored in one memory die DIE0, the program operation may be performed as indicated by a timing diagram of the case A-1.

On the contrary, after the logical addresses of the write data of 8 Kbyte, requested by the host 102, are divided into two divided logical groups 161 and 162 each corresponding to a data size of 4 Kbyte as described above, 4 Kbyte data corresponding to the first divided logical group 161 may be programmed to a first quarter part of the first SLC page PAGE0 of the first memory die DIE0, and 4 Kbyte data corresponding to the second divided logical group 162 may be programmed to a first quarter part of the first SLC page PAGE0 of the second memory die DIE1. In this case, the program operation may be performed as indicated by a timing diagram of the case B-1.

In this case, FIG. 14 shows that a program time tB required in the timing diagram of the case B-1 is shorter than a program time to required in the timing diagram of the case A-1.

FIG. 15 shows the state in which the ¼ partial program operation is allowed (i.e., P is 4 greater than 1), and the memory device 150 has an SLC 1-plane QDP structure (N=4, K=1, and L=1) as described with reference to FIG. 13, and illustrates the case in which the program operation is performed according to a write request for 16 Kbyte data having four logical addresses from the host 102.

Specifically, since the write data requested by the host 102 includes four logical addresses LBA0 to LBA3, the controller 130 may divide the four logical addresses LBA0 to LBA3 into four divided logical groups 171 to 174 by dividing the four logical addresses LBA0 to LBA3, included in the write data, by 1 which is a quotient obtained by dividing the number of memory dies, i.e., 4, by the number of partial program operations, i.e., 4. That is, the four divided logical groups 171 to 174 may include one logical address LBA0, one logical address LBA1, one logical address LBA2, and one logical address LBA3, respectively.

Since the memory device 150 has the SLC 1-plane QDP structure including SLC memory cells (L=1), mapping by the first order of the bits of the L-level cell may correspond to one divided logical group.

Since the memory device 150 has the SLC 1-plane QDP structure in which N is 4, mapping by the second order of the N memory dies DIE0, DIE1, DIE2, . . . may correspond to four divided logical groups.

Since the memory device 150 has the SLC 1-plane structure in which K is 1, mapping by the third order of the K planes may correspond to one divided logical group.

Since N is 4, L is 1 and P is 4, the reference logical unit may be set to a quarter SLC page (¼ SLC PAGE) when the number of the divided logical groups is 4 or less. That is, the number of the divided logical groups 171 to 174 is 4 and therefore the reference logical unit may be set to a quarter SLC page (¼ SLC PAGE). Here, a size of the reference logical unit may be 4 Kbyte, which is the size of a quarter SLC page (¼ SLC PAGE).

Therefore, the first divided logical group 171 of the four divided logical groups 171 to 174 may be programmed to a first quarter part of the first SLC page PAGE0 of the first memory die DIE0. Then, the second divided logical group 172 of the four divided logical groups 171 to 174 may be programmed to a first quarter part of the first SLC page PAGE0 of the second memory die DIE1. Then, the third divided logical group 173 of the four divided logical groups 171 to 174 may be programmed to a first quarter part of the first SLC page PAGE0 of the third memory die DIE2. Then, the fourth divided logical group 174 of the four divided logical groups 171 to 174 may be programmed to a first quarter part of the first SLC page PAGE0 of the fourth memory die DIE3 (B-2).

FIG. 15 also illustrates cases A-1 and A-2 in which the logical addresses of the write data requested by the host 102 are not divided into divided logical groups, but the program operation is performed through a general program method. In this case, the general program method may indicate that program operations are performed in ascending order of units. For example, a page (plane)-based program operation may be performed after a memory cell bit-based program operation, and a memory die-based program operation may be performed after the page (plane)-based program operation.

The write data requested by the host 102 has a size of 16 Kbyte, and one page has a size of 16 Kbyte. Thus, when the program operation is performed through the general program method, the write data requested by the host 102 may be programmed to first to fourth quarter parts of the first SLC page PAGE0, i.e., a whole of the first SLC page PAGE0 of the first memory die DIE0 (A-2).

In this way, when the write data of 16 Kbyte data, requested by the host 102, is all stored in one memory die DIE0, the program operation may be performed as indicated by a timing diagram of the case A-1.

On the contrary, after the logical addresses of the write data of 16 Kbyte, requested by the host 102, are divided into four divided logical groups 171 to 174 each corresponding to a data size of 4 Kbyte as described above, 4 Kbyte data corresponding to the first divided logical group 171 may be programmed to a first quarter part of the first SLC page PAGE0 of the first memory die DIE0, 4 Kbyte data corresponding to the second divided logical group 172 may be programmed to a first quarter part of the first SLC page PAGE0 of the second memory die DIE1, 4 Kbyte data corresponding to the third divided logical group 173 may be programmed to a first quarter part of the first SLC page PAGE0 of the third memory die DIE2, and 4 Kbyte data corresponding to the fourth divided logical group 172 may be programmed to a first quarter part of the first SLC page PAGE0 of the fourth memory die DIE3. In this case, the program operation may be performed as indicated by a timing diagram of the case B-1.

In this case, FIG. 15 shows that a program time tB required in the timing diagram of the case B-1 is shorter than a program time to required in the timing diagram of the case A-1.

FIG. 16 shows the state in which the ¼ partial program operation is allowed (i.e., P is 4 greater than 1), and the memory device 150 has an SLC 1-plane QDP structure (N=4, K=1, and L=1) as described with reference to FIG. 13 in accordance with an embodiment of the present disclosure, and illustrates the case in which the program operation is performed according to a write request for 8 Kbyte data having eight logical addresses from the host 102.

Specifically, since the write data requested by the host 102 includes eight logical addresses LBA0 to LBA7, the controller 130 may divide the eight logical addresses LBA0 to LBA7 into eight divided logical groups 181 to 188 by dividing the eight logical addresses LBA0 to LBA7, included in the write data, by 1 which is a quotient obtained by dividing the number of memory dies, i.e., 4, by the number of partial program operations, i.e., 4. That is, the eight divided logical groups 181 to 188 may include one logical address LBA0, one logical address LBA1, one logical address LBA2, one logical address LBA3, one logical address LBA4, one logical address LBA5, one logical address LBA6, and one logical address LBA7, respectively.

Since the memory device 150 has the SLC 1-plane QDP structure including SLC memory cells (L=1), mapping by the first order of the bits of the L-level cell may correspond to one divided logical group.

Since the memory device 150 has the SLC 1-plane QDP structure in which N is 4, mapping by the second order of the N memory dies DIE0, DIE1, DIE2, . . . may correspond to four divided logical groups.

Since the memory device 150 has the SLC 1-plane structure in which K is 1, mapping by the third order of the K planes PLANE0, PLANE1, PLANE2, PLANE3, . . . may correspond to four divided logical groups.

Since N is 4, L is 1 and P is 4, the reference logical unit may be set to a half SLC page (½ SLC PAGE) when the number of the divided logical groups is greater than 4 and equal to or less than 8. That is, the number of the divided logical groups 181 to 188 is 8 and therefore the reference logical unit may be set to a half SLC page (½ SLC PAGE). Here, a size of the reference logical unit may be 8 Kbyte, which is the size of a half SLC page (½ SLC PAGE).

Therefore, the first divided logical group 181 of the eight divided logical groups 181 to 188 may be programmed to a first quarter part of the first SLC page PAGE0 of the first memory die DIE0. Then, the second divided logical group 182 of the eight divided logical groups 181 to 188 may be programmed to a first quarter part of the first SLC page PAGE0 of the second memory die DIE1. Then, the third divided logical group 183 of the eight divided logical groups 181 to 188 may be programmed to a first quarter part of the first SLC page PAGE0 of the third memory die DIE2. Then, the fourth divided logical group 184 of the eight divided logical groups 181 to 188 may be programmed to a first quarter part of the first SLC page PAGE0 of the fourth memory die DIE3.

Then, the fifth divided logical group 185 of the eight divided logical groups 181 to 188 may be programmed to a second quarter part of the first SLC page PAGE0 of the first memory die DIE0. Then, the sixth divided logical group 186 of the eight divided logical groups 181 to 188 may be programmed to a second quarter part of the first SLC page PAGE0 of the second memory die DIE1. Then, the seventh divided logical group 187 of the eight divided logical groups 181 to 188 may be programmed to a second quarter part of the first SLC page PAGE0 of the third memory die DIE2. Then, the eighth divided logical group 188 of the eight divided logical groups 181 to 188 may be programmed to a second quarter part of the first SLC page PAGE0 of the fourth memory die DIE3.

FIG. 16 also illustrates cases A-1 and A-2 in which the logical addresses of the write data requested by the host 102 are not divided into divided logical groups, but the program operation is performed through a general program method. In this case, the general program method may indicate that program operations are performed in ascending order of units. For example, a page (plane)-based program operation may be performed after a memory cell bit-based program operation, and a memory die-based program operation may be performed after the page (plane)-based program operation.

The write data requested by the host 102 has a size of 32 Kbyte, and one page has a size of 16 Kbyte. Thus, when the program operation is performed through the general program method, the write data requested by the host 102 may be programmed to the first SLC page PAGE0 of the first memory die DIE0 and the first SLC page PAGE0 of the second memory die DIE1 (A-2).

In this way, when the write data of 32 Kbyte, requested by the host 102, is all stored in two memory dies DIE0 and DIE1, the program operation may be performed as indicated by a timing diagram of the case A-1.

On the contrary, after the logical addresses of the write data of 32 Kbyte, requested by the host 102, are divided into eight divided logical groups 181 to 188 each corresponding to a data size of 4 Kbyte as described above, 8 Kbyte data corresponding to the first and fifth divided logical groups 181 and 185 may be programmed to the first and second quarters, i.e., a half part of the first SLC page PAGE0 of the first memory die DIE0, 8 Kbyte data corresponding to the second and sixth divided logical groups 182 and 186 may be programmed to the first and second quarters, i.e., a half part of the first SLC page PAGE0 of the second memory die DIE1, 8 Kbyte data corresponding to the third and seventh divided logical groups 183 and 187 may be programmed to the first and second quarters, i.e., a half part of the first SLC page PAGE0 of the third memory die DIE2, and 8 Kbyte data corresponding to the fourth and eighth divided logical groups 184 and 188 may be programmed to the first and second quarters, i.e., a half part of the first SLC page PAGE0 of the fourth memory die DIE3. In this case, the program operation may be performed as indicated by a timing diagram of the case B-1.

In this case, FIG. 16 shows that a program time tB required in the timing diagram of the case B-1 is shorter than a program time to required in the timing diagram of the case A-1.

Figure 17:
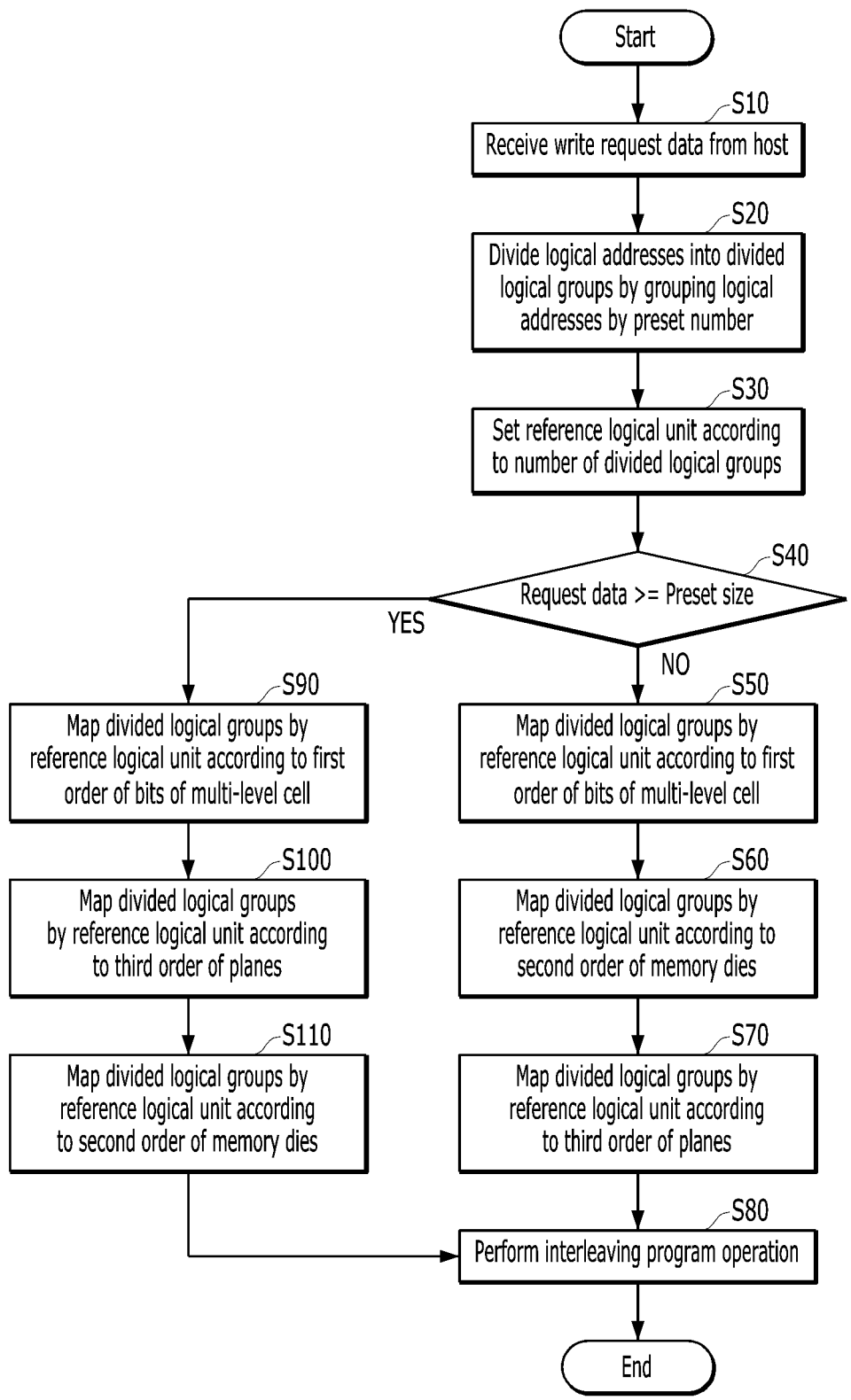
FIG. 17 is a flowchart for describing the operation of transferring data between the controller and the memory device in the memory system in accordance with an embodiment of the present disclosure.

FIG. 17 is a flowchart for describing the operation of transferring data between the controller and the memory device in the memory system in accordance with an embodiment of the present disclosure.

Referring to FIGS. 5 to 17, write data may be inputted to the controller 130 of the memory system 110 from the host 102 in operation S10.

The controller 130 may divide logical addresses of the write data inputted in operation S10 into a plurality of divided logical groups by grouping the logical addresses by a preset number, in operation S20. As described above with reference to FIGS. 5 to 16, the standards for dividing the logical addresses corresponding to the write data in operation S20 may be changed depending on whether the controller 130 allows a partial program operation on each of the plurality of pages included in the memory device 150

The controller 130 may set a reference logic unit according to the number of divided logical groups configured in operation S20, in operation S30.

The controller 130 may check whether the size of the write data inputted in operation S10 is equal to or larger than a preset size, in operation S40.

When it is checked in operation S40 that the size of the write data is less than the preset size (NO in operation S40), the controller 130 may map the plurality of divided logical groups configured in operation S20 on the basis of the reference logical unit according to the first order of the bits of the L-level cell, in operation S50. Then, the controller 130 may change the second order of the N memory dies DIE0, DIE1, DIE2, . . . , and perform mapping according to the second order, in operation S60, and then change the third order of the K planes PLANE0, PLANE1, PLANE2, PLANE3, . . . in operation S70.

When it is checked in operation S40 that the size of the write data is less than the preset size (NO in operation S40), the controller 130 may map the plurality of divided logical groups configured in operation S20 on the basis of the reference logical unit according to the orders of operations S50, S60, and S70, thereby deciding the order in which the write data inputted in operation S10 are transferred.

The controller 130 may transfer the write data by the reference logical unit to the memory device 150 according to the transfer order decided through operations S50, S60, and S70, in order to perform an interleaving program operation, in operation S90.

When it is checked in operation S40 that the size of the write data is equal to or more than the preset size (YES in operation S40), the controller 130 may map the plurality of divided logical groups configured in operation S20 on the basis of the reference logical unit according to the first order of the bits of the L-level cell, in operation S90. Then, the controller 130 may change the third order of the K planes PLANE0, PLANE1, PLANE2, PLANE3, . . . , and perform mapping according to the third order, in operation S100, and then change the second order of the N memory dies DIE0, DIE1, DIE2, . . . in operation S110.

When it is checked in operation S40 that the size of the write data is equal to or more than the preset size (YES in operation S40), the controller 130 may map the plurality of divided logical groups configured in operation S20 on the basis of the reference logical unit according to the orders of operations S90, S100, and S110, thereby deciding the order in which the write data inputted in operation S10 are transferred.

The controller 130 may transfer the write data by the reference logical unit to the memory device 150 according to the transfer order decided through operations S90, S100, and S110, in order to perform an interleaving program operation, in operation S90.

Although various embodiments have been described for illustrative purposes, it will be apparent to those skilled in the art that various changes and modifications may be made without departing from the spirit and scope of the invention as defined in the following claims. Furthermore, the embodiments may be combined to form additional embodiments.

What is claimed is:

1. A memory system comprising:
   a memory device comprising a plurality of pages each including a plurality of L-level cells, K planes each including the plurality of pages, and N memory dies each including the K planes; and
   a controller configured to:
      divide logical addresses corresponding to write data transferred from a host, into a plurality of divided logical groups by grouping the logical addresses by a preset number, when performing a program operation of storing the write data in the memory device, and
      map each of the plurality of divided logical groups to a reference logical unit, which is determined in a first order of bits of the L-level cell, a second order of the N memory dies, and a third order of the K planes according to a size of the write data, in order to decide an order in which the write data are to be transferred from the controller to the memory device,
   wherein L, N, and K are natural numbers.

2. The memory system of claim 1, wherein the controller is configured to map, when the size of the write data is less than a preset size, the write data according to the first order and then the second order and then the third order.

3. The memory system of claim 2, wherein the controller is configured to map, when the size of the write data is equal to or more than a preset size, the write data according to the first order and then the third order and then the second order.

4. The memory system of claim 3, wherein the preset size corresponds to a size of K*N pages.

5. The memory system of claim 1,
   wherein the controller is configured to divide the logical addresses corresponding to the write data into the plurality of divided logical groups by grouping the logical addresses by N, and
   wherein the controller is further configured to:
   set M pages as the reference logic unit when the number of the plurality of divided logical groups is greater than (M−1)*N*L and equal to or less than M*N*L, and
   perform a program operation on the write data in units of reference logic units,
   wherein M is a natural number equal to or less than K.

6. The memory system of claim 5,
   wherein a number of the plurality of divided logical groups is S/N when S is a multiple of N, and
   wherein S is a number of the logical addresses corresponding to the write data.

7. The memory system of claim 6, wherein the number of the plurality of divided logical groups is (S/N)+1 when S is not a multiple of N.

8. The memory system of claim 1,
   wherein the controller is configured to divide, when a 1/P partial program operation is allowed for each of the plurality of pages, the logical addresses corresponding to the write data into the plurality of divided logical groups by grouping the logical addresses by N/P, and
   wherein the controller is further configured to:
   set M/P pages as the reference logic unit when the number of the plurality of divided logical groups is greater than (M−1)*N*L and equal to or less than M*N*L, and
   perform a program operation on the write data in units of reference logical units, and
   wherein M is a natural number equal to or less than K, P is a natural number equal to or greater than 2, and N is a multiple of P.

9. The memory system of claim 8,
   wherein a number of the plurality of divided logical groups is S/(N/P) when S is a multiple of N/P, and
   wherein S is a number of the logical addresses corresponding to the write data.

10. The memory system of claim 9, wherein the number of the plurality of divided logical groups is (S/(N/P))+1 when S is not a multiple of N/P.

11. An operation method of a memory system including a memory device and a controller, the memory device comprising a plurality of pages each including a plurality of L-level cells, K planes each including the plurality of pages, and N memory dies each including the K planes and the controller configured to perform a program operation of storing into the memory device write data transferred from a host, the operation method comprising:
   a division operation of dividing, by the controller, logical addresses corresponding to the write data into a plurality of divided logical groups by grouping the logical addresses by a preset number;
   an order decision operation of mapping, by the controller, each of the plurality of divided logical groups to a reference logical unit, which is determined in a first order of bits of the L-level cell, a second order of the N memory dies, and a third order of the K planes according to a size of the write data, in order to decide an order in which the write data are to be transferred from the controller to the memory device; and a transfer operation of transferring, by the controller during the program operation, the write data in units of reference logical units from the controller to the memory device according to the order decided in the order decision operation, wherein L, N, and K are natural numbers.

12. The operation method of claim 11, wherein the order decision operation comprises mapping, when the size of the write data is less than a preset size, the write data according to the first order and then the second order and then the third order.

13. The operation method of claim 12, wherein the order decision operation comprises mapping, when the size of the write data is equal to or more than the preset size, the write data according to the first order and then the third order and then the second order.

14. The operation method of claim 13, wherein the preset size corresponds to a size of K*N pages.

15. The operation method of claim 11,
wherein the division operation comprises dividing logical addresses corresponding to the write data into the plurality of divided logical groups by grouping the logical addresses by N,
further comprising setting, by the controller, M pages as the reference logical unit when the number of the plurality of divided logical groups is greater than (M-1)*N*L and equal to or less than M*N*L, wherein M is a natural number equal to or less than K.

16. The operation method of claim 15,
wherein a number of the plurality of divided logical groups is S/N when S is a multiple of N, and
wherein S is a number of the logical addresses corresponding to the write data.

17. The operation method of claim 16, wherein the number of the plurality of divided logical groups is (S/N)+1 when S is not a multiple of N.

18. The operation method of claim 11,
wherein the division operation comprises dividing, when 1/P partial program operation is allowed for each of the plurality of pages, the logical addresses corresponding to the write data into the plurality of divided logical groups by grouping the logical addresses by N/P,
further comprising setting, by the controller, M/P pages as the reference logical unit when the number of the plurality of divided logical groups is greater than (M-1)*N*L and equal to or less than M*N*L, wherein M is a natural number equal to or less than K, P is a natural number equal to or greater than 2, and N is a multiple of P.

19. The operation method of claim 18,
wherein a number of the plurality of divided logical groups is S/(N/P) when S is a multiple of N/P, and
wherein S is a number of the logical addresses corresponding to the write data.

20. The operation method of claim 19, wherein the number of the plurality of divided logical groups is (S/(N/P))+1 when S is not a multiple of N/P.

21. A memory system comprising:
a memory device including N number of dies each including K number of planes each including one or more pages of cells, each cell storing maximally L number of bits and each page including P number of sections, each section configured to be programmed through a program operation at a time; and
a controller configured to control the memory device to store data pieces corresponding to S number of logical addresses, each data pieces corresponding to each of the S number of logical addresses, distribute data pieces corresponding to (S/N) number of logical addresses over the N dies when the S is a multiple of the N, and transfer data pieces corresponding to at least (L*P) number of logical addresses to each of the N dies,
wherein the N, the K, the L, the P, and the S are natural numbers.

22. The memory system of claim 21, wherein the controller transfers data pieces corresponding to the S number of logical addresses to one of the N dies when the S is less than the N and the S is less than or equal to the (L*P).

23. The memory system of claim 22, wherein the controller transfers data pieces corresponding to at least the (L*P) number of logical addresses to each at least two of the N dies when the S is less than the N and the S is a multiple of the (L*P).

* * * * *